United States Patent
Uehara et al.

(10) Patent No.: US 10,099,419 B2
(45) Date of Patent: Oct. 16, 2018

(54) PROCESS FOR PRODUCING POLYETHYLENE POROUS FILM AND POLYETHYLENE POROUS FILM

(71) Applicant: National University Corporation Gunma University, Gunma (JP)

(72) Inventors: Hiroki Uehara, Gunma (JP); Takeshi Yamanobe, Gunma (JP); Hidekazu Tanaka, Gunma (JP)

(73) Assignee: National University Corporation Gunma University (JP)

( * ) Notice: Subject to any disclaimer, the term of this patent is extended or adjusted under 35 U.S.C. 154(b) by 671 days.

(21) Appl. No.: 14/424,713

(22) PCT Filed: Aug. 16, 2013

(86) PCT No.: PCT/JP2013/072032
§ 371 (c)(1),
(2) Date: Feb. 27, 2015

(87) PCT Pub. No.: WO2014/034448
PCT Pub. Date: Mar. 6, 2014

(65) Prior Publication Data
US 2015/0270521 A1 Sep. 24, 2015

(30) Foreign Application Priority Data
Aug. 29, 2012 (JP) ................................. 2012-189287

(51) Int. Cl.
*B29C 55/02* (2006.01)
*B01D 71/26* (2006.01)
(Continued)

(52) U.S. Cl.
CPC .......... *B29C 55/02* (2013.01); *B01D 67/0027* (2013.01); *B01D 71/26* (2013.01);
(Continued)

(58) Field of Classification Search
None
See application file for complete search history.

(56) References Cited

U.S. PATENT DOCUMENTS 8,951,456 B2 * 2/2015 Uehara ................. B29C 55/005
264/210.1
2007/0221567 A1 9/2007 Simmons et al.

FOREIGN PATENT DOCUMENTS

CN 101568575 A 10/2009
EP 2404737 A1 1/2012
(Continued)

OTHER PUBLICATIONS

Machine translation JP 2000-109586 A (Year: 2017).*
(Continued)

*Primary Examiner* — Benjamin A Schiffman
(74) *Attorney, Agent, or Firm* — Banner & Witcoff, Ltd.

(57) ABSTRACT

Disclosed is a polyethylene porous film having an average pore diameter of 200 nm or less, a specific surface area of 50 m²/g or more, and a porosity of 15% or more, each of which is measured by a mercury intrusion method at room temperature, the polyethylene porous film being obtained by forming pores only by drawing a film containing an ultra-high molecular weight polyethylene having a viscosity average molecular weight of from 1 million to 15 million and a polyethylene having a weight average molecular weight of from 10,000 to 800,000 at a mass ratio of from 50:50 to 99:1. The polyethylene porous film is produced by molding a film using a mixture of the ultrahigh weight polyethylene and the polyethylene having a weight average molecular weight of from 10,000 to 800,000, biaxially drawing the film, then heat-treating and redrawing the film to form pores in the film.

8 Claims, 16 Drawing Sheets

(51) Int. Cl.
   *H01M 2/16* (2006.01)
   *B01D 67/00* (2006.01)
   *B32B 3/26* (2006.01)
   *B32B 27/08* (2006.01)
   *B32B 27/32* (2006.01)
   *B29K 23/00* (2006.01)
   *H01M 10/0525* (2010.01)

(52) U.S. Cl.
   CPC ............... *B32B 3/26* (2013.01); *B32B 27/08* (2013.01); *B32B 27/32* (2013.01); *H01M 2/1653* (2013.01); *B01D 2323/12* (2013.01); *B01D 2325/04* (2013.01); *B29K 2023/0683* (2013.01); *B32B 2307/718* (2013.01); *B32B 2457/10* (2013.01); *H01M 10/0525* (2013.01)

(56) References Cited

FOREIGN PATENT DOCUMENTS

| | | | |
|---|---|---|---|
| EP | 2458660 A1 | 5/2012 | |
| JP | 2000044709 A | | 2/2000 |
| JP | 2000109586 A | * | 4/2000 |
| JP | 2003103626 A | | 4/2003 |
| JP | 2004182763 A | | 7/2004 |
| JP | 2007314764 A | | 12/2007 |
| JP | 2010007053 A | | 1/2010 |
| JP | 2010167640 A | | 8/2010 |
| WO | 2010101214 A1 | | 9/2010 |
| WO | 2012029881 A1 | | 3/2012 |

OTHER PUBLICATIONS

European Search Report issued in corresponding European Application No. 13833843.9, dated Mar. 15, 2016.

English Translation of Office Action issued for corresponding Chinese Patent Application No. 2013800569514, dated Dec. 30, 2016.

* cited by examiner

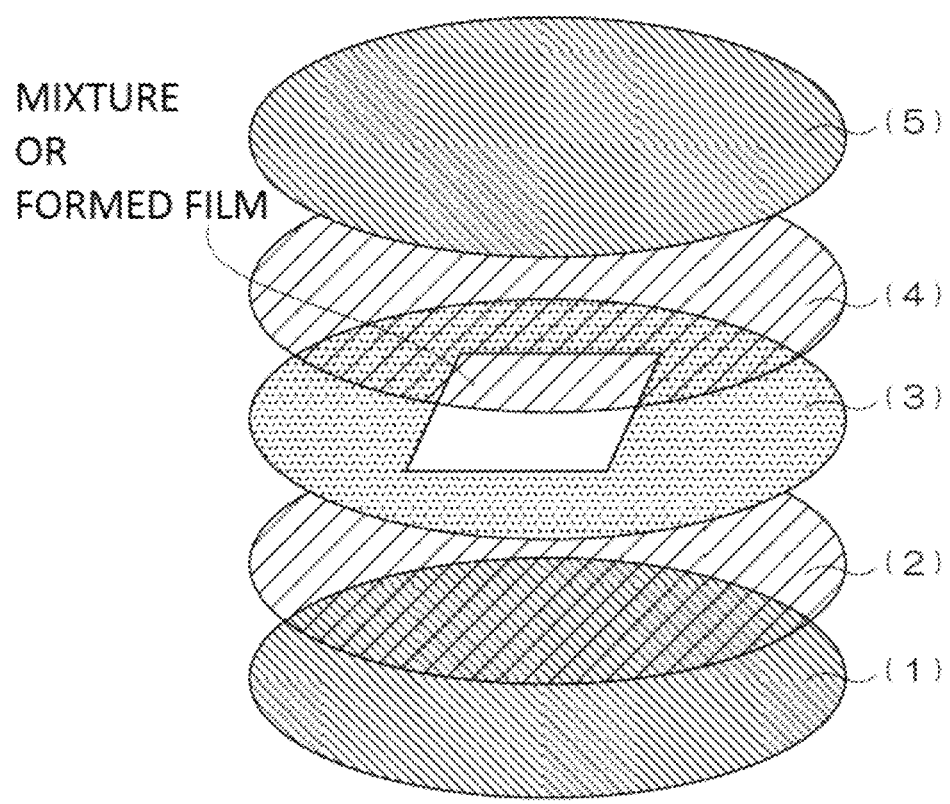

EXAMPLE 1
(UHMW-PE:NMW-PE-1=75:25)

EXAMPLE 2
(UHMW-PE:NMW-PE-1=50:50)

COMPARTIVE EXAMPLE 2
(UHMW-PE:NMW-PE-1=25:75)

PROCESS FOR PRODUCING POLYETHYLENE POROUS FILM AND POLYETHYLENE POROUS FILM

RELATED APPLICATION DATA

This application is a National Stage Application under 35 U.S.C. 371 of co-pending PCT application PCT/JP2013/072032 designating the United States and filed Aug. 16, 2013; which claims the benefit of JP application number 2012-189287 and filed Aug. 29, 2012 each of which are hereby incorporated by reference in their entireties.

TECHNICAL FIELD

The present invention relates to a process for producing a polyethylene porous film, which has so small micropore diameter as nm order (200 nm or less), high tensile breaking strength and tear strength while having large pore volume and specific surface area, and has a high gas permeation coefficient, and a polyethylene porous film obtained by the producing process.

BACKGROUND ART

A polyethylene porous film is used as a separator of a lithium ion battery. In order to make the voltage of the lithium ion battery higher, it is effective to increase the pore volume of a separator so that lithium ions can further smoothly move between electrodes. Thus, although a method of increasing the pore diameter of the separator has been employed, when the pore diameter is 1 μm or more, lithium ions in an organic electrolyte crystallize and deposit in a dendrite (arboroid) form as metallic lithium, whereby energization occurs, so that there occurs a problem that short circuiting of a battery occurs. Accordingly, in order to improve the performance of a lithium ion battery, it is required to realize such conflicting pore characteristics that a pore volume and a specific surface area increased while suppressing a pore diameter of a separator to an nm order.

Currently, pores of a polyethylene porous film used as a separator of a lithium ion battery are formed by extracting and removing an organic solvent previously impregnated in a polyethylene film as a raw material (Japanese Patent Application Laid-Open (JP-A) No. 2004-182763). In addition, a method of drawing a polyethylene film impregnated with an organic solvent, then extracting and removing a solvent, and thereby forming a porous film has been proposed (JP-A No. 2003-103626).

In those conventional processes for producing a polyethylene porous film, a phase separation structure including an organic solvent and a polyethylene component is a precursor of a porous structure, and therefore, when pores of an nm order are formed by extraction and removal of the solvent, the same or a larger amount of the solvent as/than the amount of the polyethylene component contained in a polyethylene film as a raw material is required to be impregnated. Accordingly, the production of the polyethylene porous film in which the pores are formed by removal of a large amount of the organic solvent is complex, and environmental load with volatilization of the organic solvent becomes problematic.

Meanwhile, a process for adding an inorganic fine powder with such an organic solvent, dissolving and removing them, and thereby producing a polyethylene porous film is disclosed (JP-A No. 2010-7053). However, a process for dissolving and removing the inorganic fine powder is also complex, and there is a restriction that an obtained pore diameter in principle cannot be made smaller than the size of the inorganic fine powder used in the formation of pores.

Meanwhile, the present inventors filed an application (WO 2010/101214) in which a process for producing a polyethylene porous film is disclosed, the process contains biaxially drawing an ultrahigh molecular weight polyethylene film in a molten state (at a temperature greater than or equal to the melting point of the film), then subjecting the film to a shrinkage treatment so as to express a lamellar structure having a uniform thickness, and redrawing the film in a solid-phase state (at a temperature less than or equal to the melting point of the film) to form pores in the film, whereby the polyethylene porous film having the pores of an nm order is obtained. According to the production process, since the pore formation by extraction and removal of an impregnated organic solvent and the pore formation by dissolution and removal of an added inorganic substance are not accompanied, producing a polyethylene porous film with less environmental load is possible. However, the shrinkage treatment after melt-drawing is required in this production process, and thus this production process has a room for improvement in terms of efficient production of the polyethylene porous film achieved by fewer steps.

In the above lithium ion battery, a method of increasing the number of stacked electrodes has been currently employed for realizing high output. In a flat-plate shaped lithium ion battery used in a cell phone and so on, a separator film is wound with an electrode around a core at high tension, and this wound body is formed into a flat plate shape, whereby the lithium ion battery is assembled. In this case, a separator is in a state of being apt to be ruptured by the tension in winding an electrode layer and bending in the formation into a flat plate shape. Accordingly, it is desirable to use a high strength polyethylene porous film as a separator for a lithium ion battery.

In addition to the above effects, the increase in the strength of the separator film is effective for reducing the thickness of a cell stack and realizing high integration. When the electrode layers are wound and stacked at the same tension, a separator film having a higher film strength has an advantage that it is not raptured even if the thickness of the separator film is further reduced. The reduction of the thickness of the separator film can increase the number of stacked electrode layers, and thus the realization of high output can be expected.

As means for increasing the strength of a nonporous polyethylene film, there has been proposed means for adding ultrahigh molecular weight polyethylene to normal molecular weight polyethylene (100,000 molecules or less) and drawing the polyethylene film in JP-A No. 2010-167640. It also describes that a film excellent in tensile strength and impact resistance is obtained by this means. Although a drawn polyethylene film described in JP-A No. 2010-167640 has excellent tensile strength and impact resistance and is useful as a protective member for a human body, the content of ultrahigh molecular weight polyethylene is so small as not more than 40% by mass, and it is not studied that the polyethylene film is made porous.

SUMMARY OF INVENTION

Technical Problem

An object of the present invention is to provide a polyethylene porous film, which has so small micropore diameter of nm order, high tensile breaking strength tear strength and a high gas permeation coefficient while having large pore volume and specific surface area, and a process for producing the polyethylene porous film.

Solution to Problem

As a result of intensive studies for solving the above problems, the present inventors have found that a film formed using, as a raw material, a mixture obtained by uniformly mixing an ultrahigh molecular weight polyethylene (hereinafter suitably referred to as UHMW-PE) having a viscosity average molecular weight of from 1 million to 15 million and a polyethylene (hereinafter suitably referred to as normal molecular weight polyethylene: NMW-PE) having a weight average molecular weight of from 10,000 to 800,000 is melted and drawn and then subjected to pore formation treatment, whereby the problems can be solved, and the inventors reached the present invention.

Namely, the means for solving the above problems are as follows.

(1) A polyethylene porous film having an average pore diameter of 200 nm or less, a specific surface area of 50 m$^2$/g or more, and a porosity of 15% or more, each of which is measured by a mercury intrusion method at room temperature (20° C.), the polyethylene porous film being obtained by forming pores only by drawing a film containing an ultrahigh molecular weight polyethylene having a viscosity average molecular weight of from 1 million to 15 million and a polyethylene having a weight average molecular weight of from 10,000 to 800,000 at a mass ratio of from 50:50 to 99:1.

(2) The polyethylene porous film described in (1), wherein a tensile strength measured at room temperature (20° C.) is 10 MPa or more.

(3) The polyethylene porous film described in (1) or (2), wherein an oxygen permeation coefficient measured at room temperature (20° C.) is $5\times10^{-15}$ mol·m/(m$^2$·s·Pa) or more.

(4) The polyethylene porous film described in any one of (1) to (3), wherein a weight fraction of a component having a molecular weight of 10,000 (10$^4$ g/mol) or less is 1% by weight or more, and a weight fraction of a component having a molecular weight of 1 million (10$^6$ g/mol) or more is 15% by weight or more, each of the weight fractions being estimated from a molecular weight distribution curve of contained polyethylene, which is obtained by gel permeation chromatography (GPC) measurement at 150° C. using trichlorobenzene as a solvent.

(5) A process for producing a polyethylene porous film containing:

a mixture preparation step of preparing a mixture that contains an ultrahigh molecular weight polyethylene having a viscosity average molecular weight of from 1 million to 15 million and a polyethylene having a weight average molecular weight of from 10,000 to 800,000 at a mass ratio of from 50:50 to 99:1;

a film formation step of heating and melting the mixture and forming the mixture into a film;

a drawing step of biaxially drawing the film in x-axis and y-axis directions at a temperature greater than or equal to a melting point of the film and less than or equal to 180° C.;

a heat treatment step of heat-treating the biaxially drawn film at a temperature greater than or equal to room temperature and less than or equal to 180° C., while maintaining a draw ratio of the biaxially drawn film; and a pore formation step of redrawing the heat-treated film at a temperature of 140° C. or less along at least one of the x axis or the y axis.

(6) The process for producing a polyethylene porous film described in (5), further containing, after the pore formation step, a second heat treatment step of heat-treating the film, which has been subjected to the pore formation treatment, at a temperature greater than or equal to room temperature and less than or equal to 180° C., while maintaining a draw ratio.

(7) The process for producing a polyethylene porous film described in (5) or (6), wherein, in the mixture preparation step, the mixture of the ultrahigh molecular weight polyethylene having a viscosity average molecular weight of from 1 million to 15 million and the polyethylene having a weight average molecular weight of from 10,000 to 800,000 is added to one or more solvents selected from the group consisting of a benzene derivative selected from p-xylene, m-xylene, o-xylene, tetrachlorobenzene or dichlorobenzene; decalin; tetralin and liquid paraffin, the obtained mixture is heated to a temperature greater than or equal to room temperature and less than or equal to the boiling point of the solvent to be used and is dissolved, and thereafter, the solvent is removed from the mixture.

(8) The process for producing a polyethylene porous film described in any one of (5) to (7), wherein, in the film formation step, the mixture obtained in the mixture preparation step is subjected to melt press molding at a temperature of from 140° C. to 250° C. and under a pressurized condition of from 0.1 MPa to 100 MPa.

(9) The process for producing a polyethylene porous film described in any one of (5) to (8), wherein the film formation step further comprises a step of stacking films formed by heating and melting the mixture obtained in the mixture preparation step, and thereby forming a laminate.

(10) A polyethylene porous film obtained by the process for producing a polyethylene porous film according to any one of (5) to (9).

(11) The polyethylene porous film described in (10), wherein an average pore diameter is 200 nm or less, a specific surface area is 50 m$^2$/g or more, and a porosity is 15% or more, each of which is measured by a mercury intrusion method at room temperature (20° C.).

(12) The polyethylene porous film described in (10) or (11), wherein a tensile strength measured at room temperature (20° C.) is 10 MPa or more.

(13) The polyethylene porous film described in any one of (10) to (12), wherein an oxygen permeation coefficient measured at room temperature (20° C.) is $5\times10^{-15}$ mol·m/(m$^2$·s·Pa) or more.

The pore formation process in the production process of the present invention is carried out only by drawing operation using a microstructure of a formed film and is essentially different from conventional pore formation such as pore formation by removal of a previously impregnated solvent and pore formation by removal of an inorganic additive.

Here, "forming pores only by drawing" means that pores are formed in the film, as a raw material, only by drawing operation and means that physical operation other than drawing and incidental physical operation required for drawing is not included. More specifically, forming pores only by drawing means that pores are formed only by drawing and heat treatment operation for stabilizing a structure of the film, and the drawing operation may include twice or more drawing processes.

The "forming pores only by drawing" means pore formation treatment in which operation other than drawing is not carried out in the pore formation, and examples of such operation other than drawing include (1) pore formation by volatilization and removal or extraction and removal of a solvent or the like previously impregnated in a film, (2) pore formation by removal of an inorganic additive or the like, previously mixed in a film, with a solvent, acid, or alkali, (3) pore formation by removal of a portion of a polyethylene component in a film through dipping of the film in a solvent, acid, alkali, or the like, or (4) a method of further drawing a film after the pore formation treatment according to the non-drawing treatment of (1) to (3).

However, in a porous film obtained by the "forming pores only by drawing" in the present invention, after the formation of the porous film, one or two kinds or more of operations like (1) to (3) may be suitably carried out for, for example, reinforcing a porous structure having pores formed by drawing may be carried out as incidental processing.

In the polyethylene porous film of the present invention, by virtue of the use of the specified polyethylene mixture, pores are formed only by physical drawing operation, and therefore, there is no fear of remaining of undesired impurities such as a solvent and an inorganic additive, so that a porous film having extremely uniform physical properties is obtained. Further, according to the production process of this invention, since removal processing for a solvent, an inorganic additive, or a portion of polyethylene component in a film and shrinkage treatment are not required, a porous film having a sufficient porosity and having uniform physical properties can be obtained.

Accordingly, the polyethylene porous film obtained by the production process of the present invention has various good physical properties to be described in detail below.

In the mixture preparation process, it is important to uniformly mix UHMW-PE and NMW-PE having different molecular weights, at a molecular chain level, and thus, it is preferable that after a (powdered) UHMW-PE raw material and a (powdered or pelletized) NMW-PE raw material are mixed at a predetermined mass ratio, the mixture is added to an organic solvent and heated and dissolved, and UHMW-PE and NMW-PE are uniformly mixed. When the mixing is nonuniform, distribution of the pore size in an obtained porous film is nonuniform, and a desired performance may not express.

In order to confirm that the polyethylene porous film obtained in the present invention contains UHMW-PE and NMW-PE at a predetermined mass ratio, verification of molecular weight distribution using gel permeation chromatography (GPC) measurement is effective. The method of calculating a content mass ratio of UHMW-PE and NMW-PE using the GPC measurement will be described later.

Thus obtained polyethylene porous film preferably has an average pore diameter of 200 nm or less, a specific surface area of 50 m$^2$/g or more, and a porosity of 15% or more each of which is measured by a mercury intrusion method at room temperature (20° C.). In general, when a specific surface area of a porous film is 30 m$^2$/g or more, a preferable communication property is achieved, and according to the production process of the present invention, in an obtained film, a specific surface area of 50 m$^2$/g or more as a severer requirement can be achieved.

Further, a tensile strength measured at room temperature (20° C.) is preferably 10 MPa or more.

Furthermore, an oxygen permeation coefficient measured at room temperature (20° C.) is preferably $5 \times 10^{-15}$ mol·m/(m$^2$·s·Pa) or more. In this specification, in order to evaluate the communication property of pores of a porous film, the gas permeation coefficient using oxygen as a reference, that is, an oxygen permeation coefficient is used as an index.

An index of the gas permeation coefficient in this invention is not limited to oxygen, and a gas permeation coefficient using an inert gas such as a nitrogen gas and an argon gas may be used as an index. The gas permeation coefficient obtained when a nitrogen gas or an argon gas is used as an index is also preferably $5 \times 10^{-15}$ mol·m/(m$^2$·s·Pa) or more as the permeation coefficients of those gases. In this specification, those coefficients for evaluating the communication property of a porous film are sometimes collectively referred to as "gas permeation coefficients".

The details of the method of measuring the gas permeability will be described in detail in Examples.

Although the mechanisms of the present invention are not definitive, they are presumed as follows.

According to the invention, a mixture obtained by previously uniformly mixing UHMW-PE and NMW-PE has been prepared, then the mixture is formed into a film. The film is biaxially drawn at a temperature greater than or equal to the melting point of the film, followed by heat treatment. Subsequently, the film is redrawn and whereby pores are formed in the film. Since NMW-PE is contained, spontaneous relaxation of molecular orientation occurs in a biaxial melt-drawing process, and a uniform lamellar structure exhibits. In the pore formation process, effective separation between the lamellar occurs, and a large number of pores having an nm size are uniformly formed. As a result, it is considered that a polyethylene porous film having a large pore volume, a large specific surface area, and a high gas permeation coefficient can be produced. Thus, the shrinkage treatment after biaxial melt-drawing required in the process for producing a polyethylene porous film constituted only of UHMW-PE (method described in WO 2010/101214) is eliminated, and the production process can be simplified. It is considered that since the shrinkage treatment is not carried out, pore formation treatment by redrawing can be carried out while maintaining high strength of a film so that a polyethylene porous film having high tensile breaking strength and tear strength can be produced.

Advantageous Effects of Invention

According to the present invention, a polyethylene porous film which has so small micropore diameter as nm order, and, for example, 200 nm or less, large pore volume and specific surface area, and a high gas permeation coefficient can be provided.

Further, according to the present invention, a process for producing a polyethylene porous film having high tensile breaking strength and tear strength can be provided.

Since the process for producing a polyethylene porous film of the invention does not include shrinkage treatment, a polyethylene porous film can be more simply produced.

Note that in this specification, a numerical range represented using "from . . . to" means a range including the numerical values described after "from" and after "to" as a lower limit and an upper limit, respectively.

Further, the expression "room temperature" in this specification means 20° C.

BRIEF DESCRIPTION OF DRAWINGS

FIG. 3 is a conceptual diagram showing a procedure for producing a formed film in Example.

DESCRIPTION OF EMBODIMENTS

Figure 1:
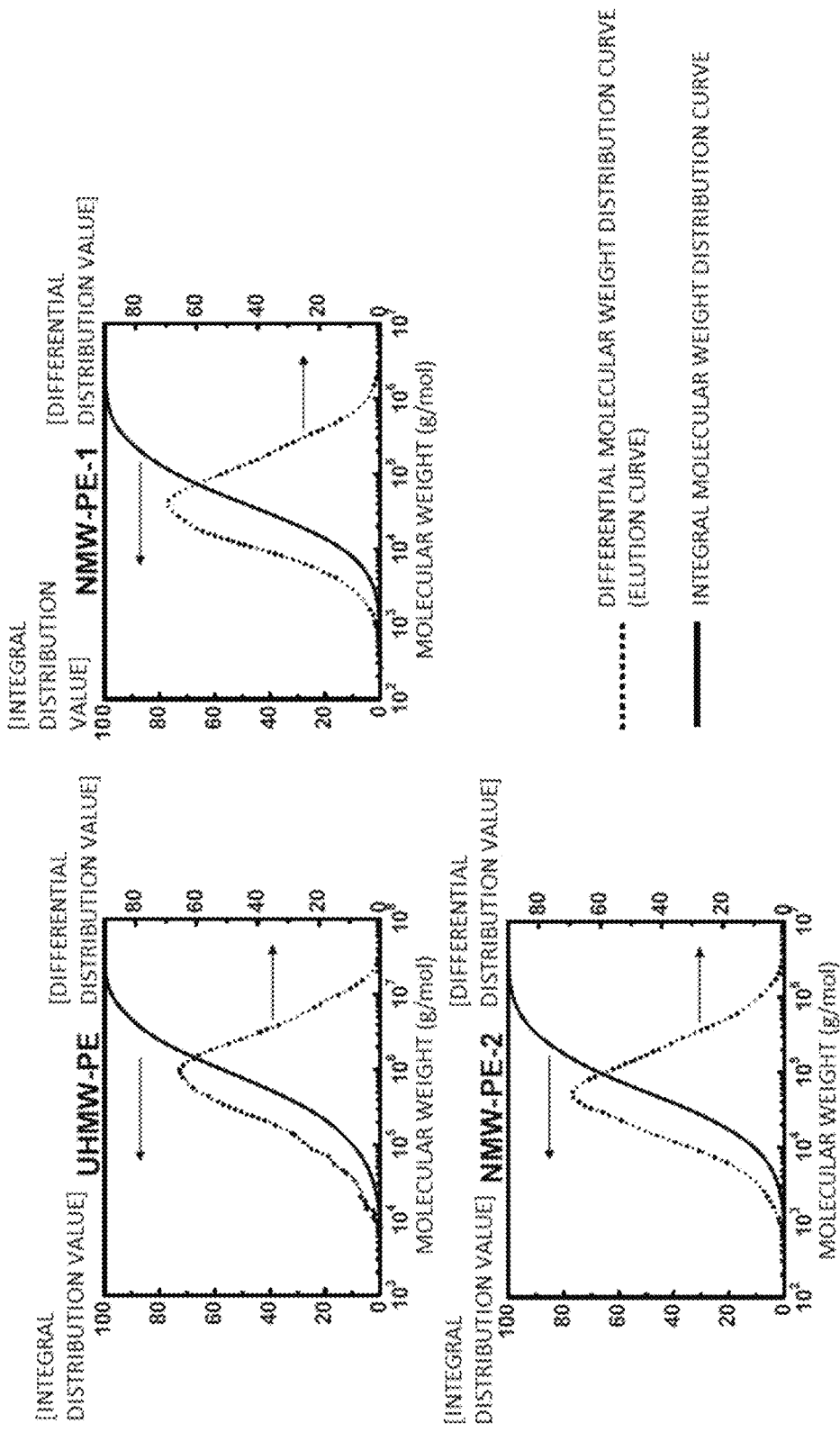
FIG. 1 is a graph showing GPC curves of UHWM-PE, NMW-PE-1, and NMW-PE-2 as raw material polyethylene used in film formation in Example.

Hereinafter, a polyethylene porous film of the present invention will be described in detail along with a process for producing the polyethylene porous film.

A polyethylene porous film of the present invention is characterized in that the polyethylene porous film has an average pore diameter of 200 nm or less, a specific surface area of 50 $m^2$/g or more, and a porosity of 15% or more, each of which is measured by a mercury intrusion method at room temperature (20° C.), and the polyethylene porous film is obtained by forming pores only by drawing a film containing an ultrahigh molecular weight polyethylene having a viscosity average molecular weight of from 1 million to 15 million and a polyethylene having a weight average molecular weight of from 10,000 to 800,000 at a mass ratio of from 50:50 to 99:1.

When the polyethylene porous film of the present invention contains UHMW-PE in an amount of 50% by mass or more as described above, high tensile strength can be maintained in pore formation treatment and uniform communication property can be obtained.

When the polyethylene porous film of the present invention contains NMW-PE in an amount of 1% by mass or more as described above, spontaneous relaxation of molecular orientation occurs after biaxial melt-drawing, and a uniform lamellar structure exhibits without shrinkage treatment. Since the shrinkage treatment is not performed, pore formation treatment by redrawing the film can be carried out while maintaining the high strength of the film, a polyethylene porous film having high tensile breaking strength and tear strength is obtained.

In this invention, UHMW-PE and NMW-PE are mixed uniformly, so that a polyethylene porous film utilizing the characteristics of both of them is produced, and, at the same time, the polyethylene porous film of the invention has so small micropore diameter as nm order (200 nm or less). This polyethylene porous film has high tensile breaking strength and tear strength while having large pore volume and specific surface area and has a high gas permeation coefficient.

It is preferable that such a porous film is obtained by a production process including the following processes (a) to (e), and the following (f) process (post-treatment process: second heat treatment process) may be further carried out if necessary.

(a) A mixture preparation process of preparing a mixture that contains an ultrahigh molecular weight polyethylene having a viscosity average molecular weight of from 1 million to 15 million and a polyethylene having a weight average molecular weight of from 10,000 to 800,000 at a mass ratio of from 50:50 to 99:1.

(b) A film formation process of heating and melting the mixture obtained by the process (a), and forming the mixture into a film.

(c) A drawing process of biaxially drawing the film obtained by the process (b), in x-axis and y-axis directions at a temperature greater than or equal to a melting point of the film and less than or equal to 180° C.

(d) A heat treatment process of heat-treating the biaxially drawn film obtained by the process (c), at a temperature greater than or equal to room temperature and less than or equal to 180° C., while maintaining a draw ratio of the biaxially drawn film.

(e) A pore formation process of redrawing the heat-treated film obtained by the process (d), at a temperature of 140° C. or less along at least one of the x axis or the y axis.

(f) A post-treatment process which is a second heat treatment process of heat-treating the film, which has been subjected to the pore formation treatment in the process (e), at a temperature greater than or equal to room temperature and less than or equal to 180° C., while maintaining a draw ratio (pore formation ratio).

[(a) A Mixture Preparation Process of Preparing a Mixture that Contains an Ultrahigh Molecular Weight Polyethylene Having a Viscosity Average Molecular Weight of from 1 Million to 15 Million and a Polyethylene Having a Weight Average Molecular Weight of from 10,000 to 800,000 at a Mass Ratio of from 50:50 to 99:1 (Hereinafter Suitably Referred to as a Mixture Preparation Process or a Process (a))]

In this invention, a process (a) for uniformly mixing UHWM-PE and NMW-PE having significantly different melt viscosities is important. In the process (a), well-known methods are applicable without particular limitation as long as UHWM-PE and NMW-PE can be uniformly mixed with each other. Here, when UHWM-PE and NMW-PE cannot be mixed uniformly, the tensile strength and the uniformity of the micropore size of a formed porous film are lowered, and thus it is not preferable.

As ultrahigh molecular weight polyethylene (UHMW-PE) used in the present invention, a powdered polyethylene raw material having a viscosity average molecular weight (Mv) of from 1 million to 15 million is used, and polyethylene having Mv of from 1.2 million to 6 million is more preferably used. A viscosity average molecular weight is measured in a decalin solvent (135° C.), and an intrinsic viscosity ([n]) is preferably from 5 dl/g to 55 dl/g, more preferably from 8 dl/g to 40 dl/g, and still more preferably from 10 dl/g to 30 dl/g.

In ultrahigh molecular weight polyethylene, it is known that the viscosity average molecular weight and the intrinsic viscosity have a relation represented by the following formula, as described in Japanese Patent Application Laid-Open (JP-A) No. 2005-314544 and JP-A No. 2005-313391.

$$Mv=5.37\times10^4[\eta]^{1.49}$$

The viscosity average molecular weight can be obtained from the measured intrinsic viscosity by using the above formula, and values thus obtained are used in the present invention.

As UHMW-PE, commercial products such as Hizex Million 340M (trade name, $Mv=3.5\times10^6$) produced by Mitsui Chemicals, Inc. and Hostalen GUR 4113 produced by Ticona LLC (trade name, $Mv=3.2\times10^6$) may be used.

As NMW-PE used in this invention, powdered or pelletized polyethylene having a weight average molecular weight (Mw) of from 10,000 to 800,000 is used, and polyethylene having Mw of from 20,000 to 500,000 is more preferably used.

(Method of Measuring Weight Average Molecular Weight)

The weight average molecular weight can be determined by gel permeation chromatography (GPC) measurement. GPC measurement is carried out under the following conditions, for example, and the weight average molecular weight (Mw), the number average molecular weight (Mn), and the molecular weight distribution (Mw/Mn) can be determined from the obtained molecular weight distribution curve.

Apparatus: HLC-8121GPC/HT (detector: RI)
Column: TSLgel $GMH_{HR}$-H(20)HT
(produced by Tosoh Corporation: 7.8 mm I.D.×30 cm)×3
Eluent: HPLC grade 1,2,4-Trichlorobenzene (produced by Wako Pure Chemical Industries, Ltd.)
(containing 0.05% by mass of dibutylated hydroxytoluene (BHT) as an antioxidant)
Flow rate: 1.0 mL/min.
Detection condition: polarity=(−)
Injection amount: 0.3 mL
Column temperature: 150° C.
Sample concentration: 0.1 to 1.0 mg/mL As an NMW-PE raw material, commercial products such as J-REX KX285N (trade name, $Mw=1.05\times10^5$) produced by Japan Polyolefins Corporation and JX-20 (trade name, $Mw=7.09\times10^4$) produced by Mitsubishi Chemical Corporation may be used.

In this specification, "GPC measurement" is carried out under the above conditions, including Examples to be described later.

Although the UHMW-PE and the NMW-PE may be polymers polymerized using a well-known catalyst, powdered or pelletized polyethylene polymerized using a Ziegler catalyst or a metallocene catalyst is preferably used.

In general, the molecular weight distribution of polyethylene synthesized with a Ziegler catalyst is larger than the molecular weight distribution of polyethylene synthesized with a metallocene catalyst which is after-mentioned, and it is known that Mw/Mn of polyethylene synthesized with a Ziegler catalyst is larger than that of polyethylene synthesized with a metallocene catalyst.

Since UHMW-PE and NMW-PE used as raw materials in the invention desirably have only ethylene as a constituent unit because of high crystallinity and excellent physical properties such as strength. However, each of UHMW-PE and NMW-PE may be a polymer or a copolymer containing a constituent unit derived from ethylene. When either one of or both the UHMW-PE and the NMW-PE is/are copolymers, examples of a constituent unit constituting the copolymer together with the ethylene constituent unit include α-olefins such as propylene, 1-butene, 1-hexene, 1-octene, and 4-methyl-1-pentene and derivatives thereof. Namely, UHMW-PE and NMW-PE according to the invention include a copolymer of ethylene and α-olefins. Accordingly, UHMW-PE and NMW-PE according to the invention include polyethylene, such as linear low-density polyethylene and low-density polyethylene having long chain branching.

The mixing ratio [mass ratio] of UHMW-PE and NMW-PE is required to be in the range of from 50:50 to 99:1. Namely, 50% by mass or more of the mixture is required to be UHMW-PE. When 50% by mass or more of the polyethylene mixture is UHMW-PE, a high tensile strength is achieved. The mixing ratio [mass ratio] of UHMW-PE and NMW-PE is preferably in the range of from 50:50 to 90:10 and more preferably from 50:50 to 80:20.

When the mixture contains 50% by mass or more of UHMW-PE, a porous film to be formed has excellent strength; however, as the content of UHMW-PE increases, the communication property of pores is deteriorated to further lower the gas permeation coefficient.

Examples of a method of mixing UHMW-PE and NMW-PE uniformly include (A1) a method of melting a powdered UHMW-PE raw material and a powdered or pelletized NMW-PE raw material, adding a high shear force, and kneading the molten mixture, (A2) a method of forming into a film a mixture obtained by melting and mixing a powdered UHMW-PE raw material and a powdered or pelletized NMW-PE raw material and forming a laminate obtained by stacking the films, (A3) a method of adding a small amount of an organic solvent that can swell polyethylene to a powdered UHMW-PE raw material, then swelling the mixture, and melting and mixing the mixture with powdered or pelletized NMW-PE raw material, (A4) a method of adding a small amount of an organic solvent that can dissolve polyethylene to a mixture of a powdered UHMW-PE raw material and an NMW-PE raw material, swelling the mixture, and then melting and mixing the mixture, (A5) a method of dissolving a powdered UHMW-PE raw material and a powdered or pelletized NMW-PE raw material respectively in an organic solvent that can dissolve polyethylene, then mixing the solutions to prepare a uniform solution, and removing the organic solvent, (A6) a method of dissolving a mixture of a powdered UHMW-PE raw material and an NMW-PE raw material into an organic solvent that can dissolve polyethylene and then removing the organic solvent, (A7) a method of, in polymerization of UHMW-PE or in polymerization of NMW-PE, mixing polyethylene of the counterpart, and thereby mixing UHMW-PE and NMW-PE, (A8) a method of synthesizing UHMW-PE and NMW-PE in the same polymerization vessel, and (A9) a method of polymerizing UHMW-PE or NMW-PE in a first polymerization vessel, then transferring the polymerized UHMW-PE or NMW-PE to a second polymerization vessel, and polymerizing polyethylene of the counterpart in the second polymerization vessel. However, the method of mixing UHMW-PE and NMW-PE uniformly is not limited to those methods.

For example, in the method (A3) or (A4), with respect to 100 parts by mass of a polyethylene mixture as a solid content or a UHMW-PE raw material, from 1 to 100 parts by mass of an organic solvent that can dissolve polyethylene is added thereto, whereby previously swelling polyethylene in a solid state facilitates uniform mixing of a UHMW-PE raw material and an NMW-PE raw material.

It is preferable that heating and mixing in the methods (A1) to (A4) is performed at a temperature greater than or equal to the melting point of the UHMW-PE raw material and the NMW-PE raw material, preferably in the range of from 140° C. to 250° C.

As the amount of the organic solvent used in the method (A5) or (A6), the organic solvent is added at a ratio of 100 parts by mass or more with respect to 100 parts by mass of polyethylene having respective molecular weights and heating and dissolving the mixture.

It is preferable that dissolving and mixing in the method (A5) or (A6) is performed at a temperature less than or equal to the boiling point of an organic solvent used in the method.

The organic solvent used in those methods is not limited particularly as long as it is a solvent that can swell or dissolve polyethylene, and a solvent selected from benzene derivatives such as p-xylene, m-xylene, o-xylene, tetrachlorobenzene, and dichlorobenzene, decalin, tetralin, and liquid paraffin is mentioned. One kind of those solvents may be used, or two or more kinds of them may be used in combination. Among them, p-xylene, trichlorobenzene, and the like are preferably used.

When those organic solvents are used, it is preferable to remove those organic solvents prior to a film formation process to be described later. In the present invention, pores are formed by separating between the lamellar crystals in a pore formation process to be described later, and pore formation by removal of a solvent is not included in the invention. When the solvent remains in the pore formation process, separation of the lamellar crystals does not progress efficiently, and therefore, uniformity of an obtained porous structure is lost.

In the polymerization in the methods (A7) to (A9), well-known catalyst systems such as Ziegler-based catalysts and metallocene-based catalysts may be used. In this case, in the polymerization of UHMW-PE and NMW-PE, the same polymerization catalyst may be used, or different catalyst systems may be used in any combination. NMW-PE may be polymerized after UHMW-PE has been polymerized, or UHMW-PE may be polymerized after NMW-PE has been polymerized.

In another preferred embodiment in a mixture preparation process, a mixture of the UHMW-PE raw material and the NMW-PE raw material is heated and melted to a temperature greater than or equal to the melting points of the UHMW-PE raw material and the NMW-PE raw material (preferably, 140° C. or more) and then kneaded and mixed.

In still another preferred embodiment, a suitable amount of a suitable organic solvent is added to 100 parts by mass of the mixture of the UHMW-PE raw material and the NMW-PE raw material, and the mixture is kneaded and mixed at a temperature greater than or equal to the melting points of the UHMW-PE raw material and the NMW-PE raw material (preferably, 140° C. or more).

Hereinafter, although the process (a) will be described using as an example, a method of dissolving raw materials in a solvent and mixing the resultant solution, the invention is not limited thereto.

First, an ultrahigh molecular weight polyethylene (UHMW-PE) powder and a normal molecular weight polyethylene (NMW-PE) powder or pellet are provided as raw materials.

Both of the raw materials are mixed at a ratio of 50:50, for example, and the mixture is added to p-xylene to be heated to 130° C. under a nitrogen gas flow, and, thus, the mixture is dissolved. At this time, an antioxidant may be added to prevent oxidative decomposition of polyethylene.

The dissolved solution is cooled to room temperature, and a suspension is obtained. The suspension is vacuum filtered to reduce the solvent, and, thus, to obtain a gelatinous mat. Acetone is sprinkled to the obtained gelatinous mat, and then solvent replacement is carried out. After that, the mat is dried to remove the solvent completely, and, thus, to obtain a mat-like mixture. The mat may be dried by air drying or reduced-pressure drying. Although the drying temperature is usually room temperature, during drying, the mat-like mixture may be heated to less than its melting point.

Preferable examples of the antioxidant that can be used in the process (a) include Irganox 1076 (trade name) produced by Ciba Geigy Corp., phenolic antioxidants such as ADK STAB MARK AO-50 (trade name) produced by Asahi Denka Kogyo Kabushiki Kaisha, phosphorous antioxidants such as ADK STAB PEP 24-G (trade name) produced by Asahi Denka Kogyo Kabushiki Kaisha, and sulfur-based antioxidants.

In the mixture preparation process, a compound other than polyethylene may be added to the mixture if necessary. As the compound which may be added to the mixture include well-known additives, there may be used compounding agents which are added to and mixed with usual polyolefin, such as a plasticizer, an antioxidant, a weather resistant agent, a light stabilizer, an ultraviolet absorbent, a heat stabilizer, a lubricant, a release agent, an antistatic agent, a flame retardant, a foaming agent, a filler such as silica, an antibacterial/antifungal agent, a nucleating agent, and a colorant. The mixture may contain one or two or more kinds of those compounding agents according to purposes within a scope of not damaging the object of the invention.

As described above, since the pore formation process in the present invention is not attributed to solvent removal, if a solvent is used in the mixture preparation process, it is preferable that the solvent is removed prior to the film formation process.

[(b) A Film Formation Process of Heating and Melting the Mixture Obtained by the Process (a), and Forming the Mixture into a Film (Hereinafter Suitably Referred to as a Film Formation Process or a Process (b))]

A method of film formation is not limited particularly, and a film is formed by, for example, press molding, roll molding, kneading/extrusion forming, a skiving method, inflation molding, or die extrusion forming. It is also preferable that those plural film formation methods are included in the film formation process. When the film formation methods are combined, the order and the number of times are not limited particularly.

When a mat-like mixture is obtained using a solvent in the process (a), of those film formation methods press molding and roll molding in which film formation can be formed while maintaining a flat plate shape of the mat-like mixture are more preferable. Before film formation using a mat-like mixture, the above-described antioxidants may be sprayed to the mat-like mixture.

The film formation process may include a process for stacking films, obtained in the film formation process, and thereby forming a laminate. In this case, film formation methods, combination thereof, and the order are not limited particularly, a process for stacking roll-molded films and press molding the laminate may be the film formation process, for example, or a process for stacking press-molded films and roll molding the laminate may be the film formation process.

The films obtained in those film formation processes are preferably nonporous films. When no pore is formed in the film formation process, pores having an nm size can be uniformly formed in the pore formation process to be described later.

It is preferable that the press molding is carried out at a pressure of from 0.01 MPa to 100 MPa, and the pressure is more preferably from 0.01 MPa to 50 MPa, and still more preferably from 0.1 MPa to 50 MPa.

It is preferable that the press molding is carried out at a temperature greater than the melting point of a mixture of an UHMW-PE raw material and an NMW-PE raw material provided in the film forming, and it is preferable that the press molding is carried out in a temperature range of from 120° C. to 250° C.

In this invention, the term "melting point" means an endothermic peak temperature (° C.) of a profile obtained by heating measurement using a differential scanning calorimeter (DSC). Although the melting point of the mixture depends on a process for producing the UHMW-PE raw material and the NMW-PE raw material, the molecular weights thereof, and a method of mixing the UHMW-PE raw material and the NMW-PE raw material, it is about from 120° C. to 145° C. When there are a plurality of melting peaks, a temperature at the peak where the intensity (endothermic amount) is highest is a melting point.

When the mat-like mixture obtained in the process (a) is formed into a film, the mat-like mixtures may be stacked, and the laminate may be press-molded. It is preferable in terms of uniformity of a film to be obtained that the film is formed while holding those mat-like mixtures or the laminate thereof between release films such as a polyimide film. In this case, any release film can be used as long as the release film can maintain its shape even at a heating temperature in the film formation.

After those mat-like mixtures are stacked, the laminate is held between release films and may be press-molded.

Further, a film obtained by press molding may be press-molded again or may be stacked and then press-molded.

The press molding may be carried out under a normal pressure, using a usual press apparatus or may be carried out under reduced pressure (for example, $10^{-1}$ Torr, that is, 13.3322 Pa or less), using a vacuum press apparatus.

The roll molding is described in detail in JP-A No. 2003-165155 and can be applied to the present invention. Methods used in the roll molding include a method of passing the mat-like mixture through a gap between a pair of rolls and forming the mixture into a film, a method of laminating and roll molding or repeating roll molding into a film, and a method of passing a mixture with a powdered or granulated form through a gap between rolls. The films obtained by those roll molding methods are stacked, and then the roll molding may be further carried out.

In terms of uniformity/strength of a polyethylene film to be obtained, a gap between rolls in the roll molding is preferably from 0.005 mm to 10 mm, more preferably from 0.005 mm to 0.1 mm, and still more preferably from 0.005 mm to 0.05 mm. The rotational speed of each roll in the roll molding is preferably from 0.1 m/min to 10 m/min, and in terms of the uniformity of the polyethylene film to be obtained and excellent mechanical properties such as breaking strength, the rotational speed is more preferably from 1 m/min to 10 m/min.

The roll used in the roll molding may have any shape as long as it is rotatable and may be a cylindrical body, a columnar body, or a rotatable endless belt body. The roll may be formed of any material as long as the mixture of the UHMW-PE raw material and the NMW-PE raw material can be formed well into a film, and examples of the material of the roll include metals such as stainless steel, fluoro-polymer such as polytetrafluoroethylene, and polyimide resin. Among them, stainless steel is preferably used because a mat-like, powdered, granulated, or bulky polyethylene mixture is more suitably roll-molded.

It is preferable that the film formation is carried out at a temperature greater than the melting point of the mixture of the UHMW-PE raw material and the NMW-PE raw material (the mat-like, powdered, granulated, or bulk mixture). The heating temperature at this time is preferably from 120° C. to 180° C., and more preferably from 136° C. to 180° C.

The heating time is suitably selected depending on the film formation method, and in the press molding, for example, heating is performed for from 1 minute to 60 minutes depending on a material to be used. In the roll molding, a contact time with a heating roller is the heating time.

In the process (b), although the press molding or the roll molding is preferably performed, a plurality of different forming methods (for example, roll molding, press molding, and extrusion) may be combined. In this case, the order and combination of those forming methods are arbitrary, and any of those forming methods may be repeated arbitrary times. After films obtained by any one of the forming methods have been stacked, the same or different forming methods may be applied to the stacked films. For example, the press molding may be carried out after the roll molding, or the roll molding may be carried out after the press molding. At this time, films may be stacked.

When the press molding is carried out after the roll molding, it is preferable that the roll molding is carried out in a temperature range of from 120° C. to 180° C., and the press molding is carried out in a temperature range of from 130° C. to 250° C.

A uniform film can be formed by the process (b).

After those film formation processes, it is preferable that the film is cooled to 120° C. or less to crystallize polyethylene (UHMW-PE and NMW-PE), and the film is taken out and provided in the drawing process to be described later.

[(c) A Drawing Process of Biaxially Drawing the Film Obtained by the Process (b), in x-Axis and y-Axis Directions at a Temperature Greater than or Equal to a Melting Point of the Film and Less than or Equal to 180° C. (Hereinafter Suitably Referred to as a Drawing Process or a Process (c))]

A polyethylene film formed in the process (b) is biaxially drawn in the x-axis and y-axis directions at a temperature greater than or equal to the melting point of the film and less than or equal to 180° C. Although the biaxial drawing may be sequential biaxial drawing in which the film is drawn in one direction (x-axis direction) and then drawn in another direction (y-axis direction) perpendicular to the direction, simultaneous biaxial drawing in which the film is drawn simultaneously in the x-axis and y-axis directions (horizontally and vertically) is preferred.

In the drawing process, uniaxial drawing is not carried out, but the biaxial drawing is carried out, whereby the tensile strength in all directions can be improved. When a film is drawn at a temperature greater than or equal to the melting point of the film, high-draw-ratio drawing is achieved without exhibiting a porous structure, so that it is advantageous for increase in the strength of the film.

The biaxial drawing processing is carried out in a temperature range of greater than or equal to the melting point of the polyethylene film formed in the process (b) and less than or equal to 180° C. The temperature range is preferably from 120° C. to 180° C., more preferably from 130° C. to 180° C., still more preferably from 136° C. to 180° C., and most preferably from 136° C. to 170° C. The temperature may be varied during the biaxial drawing processing as long as it is within the temperature range.

The temperature condition in the biaxial drawing processing may be suitably selected depending on the viscosity average molecular weight (Mv) and copolymerization composition of UHMW-PE contained in a mixture. For example, when the viscosity average molecular weight of UHMW-PE is near 1 million, it is preferable that the temperature is approximately from 136° C. to 145° C. that is near the melting point. However, as the molecular weight increases, the heat characteristics of a formed film are changed; therefore, the biaxial drawing processing can be carried out under higher temperature conditions.

The draw ratio in biaxial drawing in both the x-axis direction and the y-axis direction is preferably from 2 to 50 times the length before drawing, and more preferably from 5 to 20 times. The draw ratios in the x-axis direction and the y-axis direction may be the same or different.

The drawing speed is preferably in a range of from 1 mm/min to 1000 mm/min, and more preferably in a range of from 10 mm/min to 500 mm/min.

Before the biaxial drawing processing, a holding process for holding at the temperature for biaxial drawing for a fixed time may be provided. In this case, a time for temperature holding is preferably 1 to 180 minutes, and more preferably 1 to 10 minutes.

In order to efficiently carry out biaxial drawing in a molten state, it is preferable that drawing is carried out, using a hot air blowing type biaxial drawing machine in such a state that while only a center of a film is molten but a chuck portion (an end portion) is not molten. In this case, it is preferable to use a biaxial drawing machine equipped with a stress detection mechanism in order to confirm that the biaxial drawing is carried out in a molten state. The film thickness is reduced with drawing, so that the chuck portion (the end portion) is apt to slip; therefore, it is preferable to provide a chuck mechanism, which always applies a constant gripping force to a film, such as an air-chuck mechanism.

[(d) A Heat Treatment Process of Heat-Treating the Biaxially Drawn Film Obtained by the Process (c), at a Temperature Greater than or Equal to Room Temperature and Less than or Equal to 180° C., while Maintaining a Draw Ratio of the Biaxially Drawn Film (Hereinafter Suitably Referred to as a Heat Treatment Process or a Process (d))]

The biaxially drawn film obtained by the process (c), while the draw ratio of the biaxially drawn film is maintained, that is, while the size after drawing is maintained, is cooled to the temperature less than the drawing temperature, more specifically a temperature range of greater than or equal to the room temperature and less than or equal to 180° C., for example, and the temperature is maintained for from 1 minute to 180 minutes. The lowered temperature is maintained at from 60° C. to 150° C., and more preferably from 80° C. to 140° C. It is preferable that the temperature is maintained for from 1 minute to 180 minutes.

Further, it is preferable that the temperature lowering rate is from 1° C./min to 1000° C./min. As described above, when heat treatment is carried out while maintaining a fixed size, it is considered that a fine structure of a film formed in the biaxially drawing process is fixed in a good state.

In the heat treatment process, a drawn film thus obtained is heat-treated in the temperature range of greater than or equal to the room temperature and less than or equal to 180° C., while maintaining the draw ratio of the biaxially drawn film. The heat treatment process determines a uniform structure of lamella crystal to be described later, and a uniform pore structure is obtained in the pore formation process (e) to be carried out subsequently.

[(e) A Pore Formation Process of Redrawing the Heat-Treated Film Obtained by the Process (d), at a Temperature of 140° C. or Less Along at Least One of the x Axis or the y Axis (Hereinafter Suitably Referred to as a Pore Formation Process or a Process (e))]

The heat-treated film obtained in the process (d) is redrawn while maintaining the temperature at 140° C. or less, whereby the pore formation treatment is applied to the film.

In this case, after the drawing process as the process (c) and the heat treatment process (d) to be carried out after the process (c), prior to the pore formation process (e), the polyethylene film may be subjected to temperature-lowering processing in which the temperature of the film is lowered to less than or equal to the melting points of the UHMW-PE raw material and the NMW-PE raw material or less than or equal to the crystallization temperature in order to determine (crystallize) a lamellar structure.

Although the temperature in the pore formation treatment is 140° C. or less, the temperature is preferably from room temperature to 130° C. When the pore formation treatment is carried out in those temperature ranges, pores are formed by separating between the lamellar crystals, and the gas permeability of an obtained polyethylene porous film can be enhanced.

The redrawing speed in the pore formation treatment is preferably in a range of from 1 mm/min to 1000 mm/min, and more preferably in a range of from 5 mm/min to 100 mm/min. When the redrawing speed is in such a range, the necessary pore formation treatment can be more efficiently carried out without reducing the strength of the polyethylene porous film to be obtained.

Before the pore formation treatment, a holding process for holding at the temperature for pore formation for a fixed time may be provided. In this case, a time for temperature holding is preferably from 1 second to 180 minutes, and more preferably from 1 minute to 10 minutes.

The pore formation treatment may be carried out by uniaxial drawing or biaxial drawing. The draw ratio (pore formation ratio) in both the x-axis direction and the y-axis direction is preferably from 1.1 to 10.0 times the length of a film before the pore formation treatment. Accordingly, "total draw ratio=biaxial draw ratio in process (c)×pore formation ratio in process (e)". In the biaxial drawing, simultaneous biaxial drawing may not be necessarily performed, and instead sequential drawing may be performed. The draw ratios in the x-axis direction and the y-axis direction may be the same or different from each other. The temperature may be varied during the pore formation treatment as long as it is within the above temperature range.

In the pore formation process (e) in the present invention, the heat-treated film is redrawn along at least one of the x axis and the y axis at a temperature of 140° C. or less to apply the pore formation treatment to the film, and, thus, to obtain a porous film, as described above. In this invention, in the pore formation process, a microstructure of a film is adjusted, whereby fine and uniform pores can be formed only by the drawing processing, and the invention is essentially different from conventional pore formation such as pore formation by removal of a previously impregnated solvent and pore formation by removal of an inorganic additive. Accordingly, an obtained porous film has an advantage that problems such as deterioration and non-uniformity due to residues of the solvent and the inorganic additive do not occur.

Since the pore formation process (e) is carried out by redrawing, the breaking strength of a porous film after the pore formation is often higher than that of the film before the pore formation. Accordingly, the pore formation process has effects of not only forming pores in a film but also increasing the film strength. When redrawing is carried out, the gas permeability may be uncommonly lowered. It is considered that this is because when a drawing ratio exceeds an optimum value due to the redrawing, some pores are closed, so that the porosity is lowered.

The porous film thus obtained can be subjected to the post-treatment process (f) to be described later, that is, a second heat treatment process, if desired. The pore formation structure of the porous film formed in the pore formation process (e) is further stabilized by the post-treatment process (f).

[(f) A Post-Treatment Process which is a Second Heat Treatment Process of Heat-Treating the Film (Porous Film), which has been Subjected to the Pore Formation Treatment in the Process (e), at a Temperature Greater than or Equal to Room Temperature and Less than or Equal to 180° C., while Maintaining a Draw Ratio (Pore Formation Ratio) (Hereinafter Suitably Referred to as a Post-Treatment Process or a Process (f))]

After the pore formation process (e), there may be carried out the post-treatment process in which the film subjected to the pore formation treatment is held for from 1 minute to 180 minutes in the temperature range of greater than or equal to the room temperature and less than or equal to 180° C. while maintaining the draw ratio (pore formation ratio), that is, while maintaining the size of the porous film drawn in the pore formation process. In the post-treatment process when the porous film is maintained at the pore formation ratio, and the second heat treatment as the post-treatment process is carried out, damage of the formed porous structure or closing of the porous structure due to heat shrinkage is suppressed, and the formed pores are further stably fixed, so that the film strength can be further enhanced.

The pore formation process (e) and the post-treatment process (f), carried out thereafter, if desired, may be repeated twice or more, and the order and the number of times are arbitrary. When those processes are repeatedly carried out, those processes may be carried out after the temperature has been temporarily lowered to less than or equal to the melting point or less than or equal to the crystallization temperature or may be carried out while maintaining the pore formation treatment temperature or the post-treatment temperature without lowering the temperature.

As described above, when the pore formation process is repeatedly carried out, it is preferable that the porous film subjected to the pore formation treatment one time is subjected to temperature lowering processing so that the temperature is lowered to less than or equal to the melting points of the UHMW-PE raw material and the NMW-PE raw material or less than or equal to the crystallization temperature, and the pore formation treatment is then carried out again.

In the present invention, a polyethylene porous film obtained after such various kinds of processes is finally taken out at room temperature and is used for various applications.

After the production of the polyethylene porous film of the present invention, when an electron beam or radiation is applied to the porous film to apply cross-linking treatment to the polyethylene component (UHMW-PE or NMW-PE or both of them) within a scope of not damaging the object of the invention, the chemical resistance, the dimensional stability, and the heat resistance can be enhanced.

Further, after the production of the polyethylene porous film of this invention, when a surface modifier such as a well-known coat agent, a coating agent, a surfactant, a polymer emulsion, metal, carbon, a ceramic layer, silica particles, or clay, as it is or after being dispersed in a solvent, is spin-coated, dip-coated, rubbed, painted, deposited, or sputtered on a surface of the porous film within a scope of not damaging the object of the invention, hydrophilicity, adhesiveness, cell adsorptive property, and so on can be imparted to the film. In this case, plural of the above surface modifier or solvent may be mixed, or those surface modification treatments may be carried out plural times, and their combinations are arbitrary.

Prior to those surface modification treatments, surface treatment such as plasma treatment, corona treatment, heavy ion irradiation treatment, ultraviolet irradiation treatment, and electron irradiation treatment may be applied to the polyethylene porous film of this invention.

The polyethylene porous film of the present invention is characterized in that the polyethylene porous film has an average pore diameter of 200 nm or less, a specific surface area of 50 m$^2$/g or more, and a porosity of 15% or more, each of which is measured by a mercury intrusion method at room temperature (20° C.), the polyethylene porous film is obtained by forming pores only by drawing a film containing an ultrahigh molecular weight polyethylene having a viscosity average molecular weight of from 1 million to 15 million and a polyethylene having a weight average molecular weight of from 10,000 to 800,000 at a mass ratio of from 50:50 to 99:1.

The average pore diameter, the specific surface area, and the porosity in this specification are measured by a mercury intrusion method. More specifically, they are measured at room temperature, using Pascal 140 and 440 (manufactured by CE Instruments Ltd).

The average pore diameter of pores and the pore volume are calculated from the following relation (1) as an approximation of the pore radius and a pressure.

$$\text{Relation: radius } R = 0.75 \, \mu\text{m}/P \tag{1}$$

(where P represents pressure (MPa).)

The surface specific area is calculated from the obtained results of pore distribution and the pore volume.

As the measurement conditions, when the measurement range is from 0.3 kPa to 400 kPa, the measurement is carried out at room temperature, using Pascal 140; meanwhile, when the measurement range is from 0.1 MPa to 400 MPa, the measurement is carried out at room temperature, using Pascal 440.

<Powder Density>

The powder density (Pd) according to a mercury intrusion method is calculated using the following formula (2) of a liquid phase substitution method (pycnometer method) for density measurement.

$$Pd = \frac{Wb - Wa}{Wb - Wa - Wc + Wd} \times Ld \quad (2)$$

Pd: powder density of sample (g/cm³)
Wa: mass of tare (cell for measurement) (g)
Wb: mass of tare+mass of sample (g)
Wc: mass of tare+mass of sample+mass of mercury (g)
Wd: mass of tare+mass of mercury (g)
Ld: density of mercury (g/cm³)

<Sample Volume>

The sample volume is calculated from the powder density of the sample and the sample mass thus obtained, in accordance with the following formula (3).

$$\text{Sample volume (cm}^3) = \frac{\text{sample mass (g)}}{\text{powder density (g/cm}^3)} \quad (3)$$

<Porosity>

The porosity is calculated from a total volume (measurement value) of mercury press-filled into the sample and a volume of the sample, in accordance with the following formula (4).

$$\text{Porosity (\%)} = \frac{\text{total volume of press-filled mercury (cm}^3)}{\text{volume of sample (cm}^3)} \quad (4)$$

The shape of the pores of the polyethylene porous film of this invention can be confirmed from a scanning electron microscope (SEM) image or the like, as seen in Examples to be described later.

The content ratio (mass ratio) of UHMW-PE and NMW-PE in the formed polyethylene porous film can be confirmed by the above-described gel permeation chromatography (GPC) measurement. FIG. 1 shows GPC curves of one kind of UHMW-PE raw material (UHMW-PE) and two kinds of NMW-PE raw materials (NMW-PE-1 and NMW-PE-2) used in Examples to be described later. The GPC measurement was carried out under the already described measurement conditions.

FIG. 1 shows the GPC curves of UHMW-PE, NMW-PE-1, and NMW-PE-2 used in the film formation in Examples to be described later.

The GPC curve shown in FIG. 1 shows that while the UHMW-PE raw material contains only less than 1 part by mass of a polyethylene component having a molecular weight of 10,000 ($10^4$ g/mol) or less, the NMW-PE raw material contains only less than 2 parts by mass of a polyethylene component having a molecular weight of 1 million ($10^6$ g/mol) or more. Therefore, in the polyethylene porous film of this invention, when a mass fraction of the polyethylene component having a molecular weight of 10,000 ($10^4$ g/mol) or less and a mass fraction of the polyethylene component having a molecular weight of 1 million ($10^6$ g/mol) or more are measured, the mass ratio of the UHMW-PE raw material and the NMW-PE raw material contained in the polyethylene porous film of this invention can be defined.

In the UHMW-PE raw material used in Examples of the present invention to be described later, a mass fraction of a polyethylene component having a viscosity average molecular weight of 1 million ($10^6$ g/mol) or more was 45%. Since a maximum value of the content ratio of the UHMW-PE raw material limited in this invention is 50% by mass, the mass ratio of the polyethylene component having a molecular weight of 1 million ($10^6$ g/mol) or more in the polyethylene porous film produced by this invention is limited to 15% by mass or more.

Meanwhile, in the case of the polyethylene component having a weight average molecular weight of 10,000 ($10^4$ g/mol) or less, since a minimum value of a content rate of an NMW-PE raw material (for example, NMW-PE-1 and NMW-PE-2 to be described later) is 1% by mass, the mass fraction of the polyethylene component having a weight average molecular weight of 10,000 ($10^4$ g/mol) or less in the polyethylene porous film produced by this invention is limited to 1% by mass or less.

In a case in which the produced polyethylene porous film is dissolved under similar conditions to those used in the already described GPC measurement, when an insoluble polyethylene component remains, a mass ratio is calculated by adding a mass fraction of the insoluble polyethylene component as the polyethylene component having a molecular weight of 1 million ($10^6$ g/mol) or more.

In Examples to be described later, the mass ratio of the UHMW-PE raw material and the NMW-PE raw material contained in the polyethylene porous film of this invention was estimated by those verification methods. As a result, according to correlation with a preparation ratio, it was confirmed that the estimated results coincided well with the measurement results obtained by the measurement method.

Since the porous film of the present invention has minute through holes, the porous film can achieve an oxygen permeation coefficient of $5 \times 10^{-15}$ mol·m/(m²·s·Pa) or more when the oxygen permeation coefficient is measured at room temperature (20° C.), and the oxygen permeation coefficient is preferably $1 \times 10^{-14}$ mol·m/(m²·s·Pa) or more.

Since the polyethylene porous film of this invention is mainly composed of UHMW-PE, the polyethylene porous film can achieve high mechanical properties in which the tensile strength measured at room temperature (20° C.) is 10 MPa or more, while having the minute through holes. The strength is preferably 20 MPa or more.

In the polyethylene porous film obtained by the production process of this invention, pores are uniformly formed in a high strength film mainly composed of ultrahigh molecular weight polyethylene (namely, the content is 50% by mass or more), and the polyethylene porous film is excellent in ion permeability and gas permeability and thus used for various applications. In particular, the polyethylene porous film is useful as a separator of a lithium ion battery, due to its characteristics.

In the prior art, in a method of manufacturing a separator of a lithium ion battery, a film is formed, and an organic solvent (such as decalin and paraffin) previously mixed in the film is volatilized or extracted and removed to form pores. The obtained film is drawn, and the pore size is adjusted (JP-A No. 2004-182763). Meanwhile, in this invention, since the pores having the nm size (200 nm or less) can be formed only by drawing, the production process hardly applies a load to environment and does not harm the health of production workers.

A lithium ion battery has excellent features such as a high operating voltage, a high energy density, no memory effect, and long cycle life of discharge and charge and is widely used as a secondary battery of, for example, a note-book type personal computer, a digital camera, a video camera, or a cell phone.

As a basic structure of the lithium ion battery, the lithium ion battery is constituted of at least a positive electrode having a positive electrode active material and a positive electrode collector, a negative electrode having a negative electrode active material and a negative electrode collector, a separator, and an electrolyte. In general, the positive electrode and the negative electrode are arranged through an electrolyte permeable separator and this assembly is sealed by an exterior material in this state. An aluminum foil is used as the positive electrode collector, and a copper foil is used as the negative electrode collector. The separator is required to have a good ion conductivity in an electrolyte, mechanical strength and thermal stability, therefore, the porous film of this invention having higher uniformity, an excellent ion conductivity, and a higher mechanical strength than conventional porous films obtained by solvent removal is suitable for the separator.

EXAMPLES

Hereinafter, although Examples of the present invention will be described, the invention is not limited to the following Examples.

Example 1

(a) Mixture Preparation Process

Powdered UHMW-PE (Hizex Million 340M produced by Mitsui Chemicals, Inc., Mv=3.5×10$^6$, average particle diameter: 150 μm), powdered NMW-PE-1 (J-REX KX285N produced by Japan Polyolefins Corporation, Mw=1.1×10$^5$, average particle diameter: 300 μm), and powdered NMW-PE-2 (Mw=1.4×10$^5$, average particle diameter: 250 μm) are provided.

The following table 1 shows details of those polyethylene raw materials. The polyethylene raw materials are those synthesized using Ziegler-based catalysts.

TABLE 1

|  | Viscosity average molecular weight Mv (g/mol) | Weight average molecular weight Mw (g/mol) | Number average molecular weight Mn (g/mol) | Molecular weight distribution Mw/Mn | Melting point $T_m$ (° C.) |
|---|---|---|---|---|---|
| UHMW-PE | 3.5 × 10$^6$ | 1.8 × 10$^6$ | 2.3 × 10$^5$ | 7.8 | 140.1 |
| NMW-PE-1 | — | 1.1 × 10$^5$ | 1.7 × 10$^4$ | 6.0 | 136.3 |
| NMW-PE-2 | — | 1.4 × 10$^5$ | 2.1 × 10$^4$ | 6.5 | 135.0 |

Figure 2:
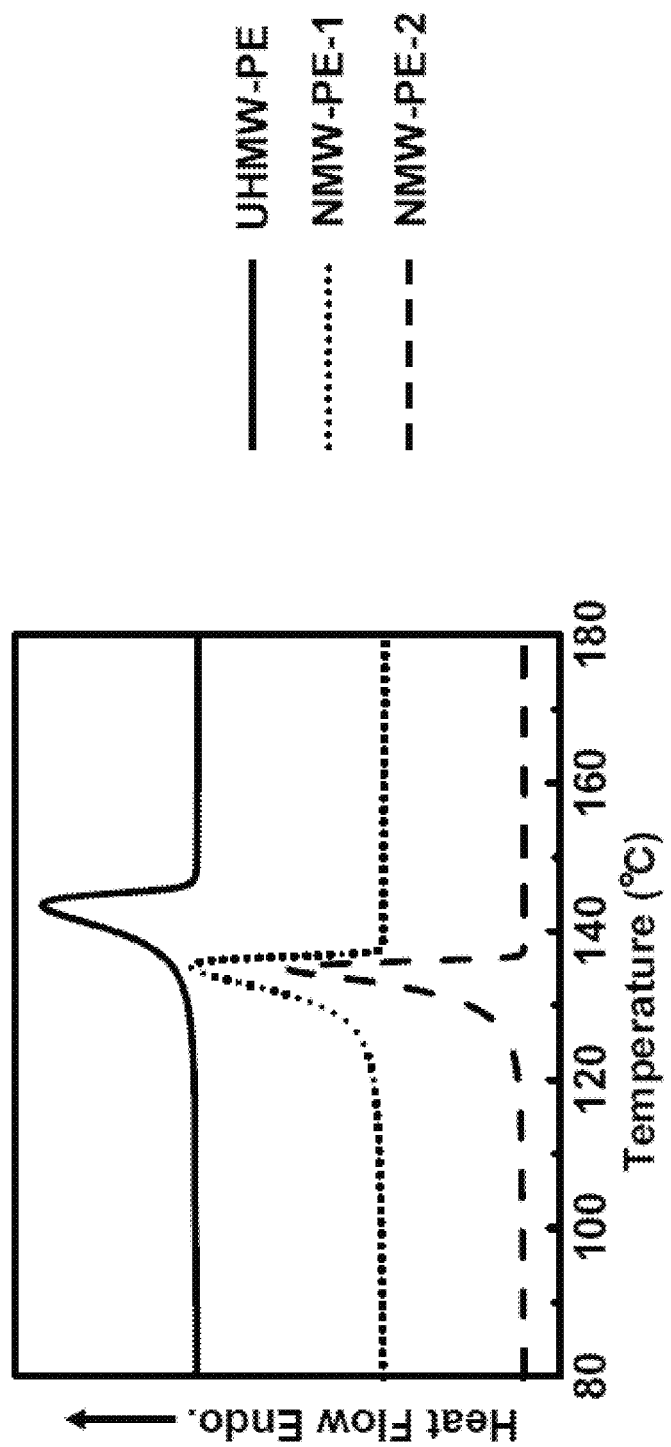
FIG. 2 is a graph showing DSC melting profiles of UHWM-PE, NMW-PE-1, and NMW-PE-2 as raw material polyethylene used in the film formation in Example.

The melting point (Tm) of each of those polyethylene raw materials is the endothermic peak temperature (° C.) estimated from a DSC melting profile shown in FIG. 2.

<DSC Heating Measurement>

With respect to the UHMW-PE raw material, the NMW-PE-1 raw material, and the NMW-PE-2 raw material, DSC measurement (diamond DSC manufactured by Perkin Elmer Co., Ltd.) was carried out under the condition such that the temperature was increased from 50° C. to 180° C. at a rate of temperature increase of 10° C./min. In this case, about 5 mg of a sample encapsulated in an aluminum pan was provided for the DSC measurement. The temperature and the fusion heat were calibrated using reference materials (indium and tin).

5 g of a mixture obtained by mixing UHMW-PE and NMW-PE-1 at a mass ratio of 75:25 was added into 1000 mL of p-xylene to be heated to 130° C. under a nitrogen gas flow and, thus, to be dissolved for 10 minutes. At this time, in order to prevent oxidation degradation of polyethylene, 0.25 g of a phenolic antioxidant (ADK STAB MARK AO-50 (trade name) produced by Asahi Denka Kogyo Kabushiki Kaisha) and 0.25 g of a phosphorous antioxidant (ADK STAB PEP 24-G (trade name) produced by Asahi Denka Kogyo Kabushiki Kaisha) with respect to 1000 mL of a solution were added.

The solution was cooled to room temperature (20° C.) to obtain a suspension.

The suspension was vacuum filtered using a Buchner funnel to remove a portion of a solvent, and, thus, to obtain a gel-like material. Acetone was sprinkled to the obtained gel-like material, thereby the solvent replacement was carried out. As a result, a white mat-like material was obtained.

The white mat-like material was dried by air drying at room temperature for one day in the draft chamber and further dried by reduced-pressure drying at 50° C. for 24 hours to obtain a mat-like mixture. 5 mL of acetone containing the above-described two kinds of antioxidants in a concentration of 0.1% by mass, respectively, was sprayed on the entire surface of the mat-like mixture to be dried by air drying for 24 hours, and, thus, to finally obtain a mat-like mixture provided in the following film formation process.

<Thermogravimetry (TGA)>

In order to verify an amount of a solvent remaining in the dried mat-like mixture, thermogravimetry analysis (TGA) was carried out. In the TGA measurement, a TG8120 thermogravimetric analyzer (aluminum pan) manufactured by Rigaku Corporation was used, the temperature was increased under a nitrogen atmosphere in a temperature range of from room temperature to 500° C. at the heating rate of 5° C./min, and weight reduction accompanying solvent volatilization was recorded. In this case, alumina was used as a reference material. An amount of the sample was about 10 mg.

As a result, a weight loss at 150° C. which corresponds to the temperature higher than the boiling point of the used organic solvent (p-xylene) was 0.3% by mass, and it was confirmed that the solvent hardly remained in the mat-like mixture sample provided for the film formation process.

[(b) Film Formation Process]

FIG. 3 is a conceptual diagram showing a production procedure of the film formation process in Example.

As shown in FIG. 3, a polyimide release film (2) having a thickness of 125 μm was put on a disk-shaped stainless plate (1) having a diameter of 110 mmφ×a thickness of 2 mm, a disk-shaped stainless plate (3) having a diameter of 110 mmφ×a thickness of 0.25 mm from which a rectangular window having a size of 70 mm×70 mm has been bored was put thereon, and about 2 g of the mat-like mixture was put in the rectangular window. A polyimide release film (4) having a thickness of 125 μm was put thereon, and a disk-shaped stainless plate (5) having a diameter of 110 mmφ×a thickness of 2 mm was further put thereon.

The assembly was held between upper and lower press mechanisms installed in a bench press apparatus, and was maintained at 190° C., which is higher than the melting point of polyethylene, for five minutes. Then, melt press molding was carried out at a pressure of 2.5 MPa (cylinder pressure: 30 MPa). After the temperature was slowly lowered to room temperature, the assembly was taken out, whereby a film (hereinafter suitably referred to as a press-molded film) containing UHMW-PE and NWM-PE-1 at a mass ratio of 75:25 was formed.

[(c) Drawing Process]

The obtained press-molded film was simultaneously biaxially drawn to 10×10 at a drawing temperature (Td) of 150° C. and a drawing speed of 100 mm/min (the obtained drawn film is hereinafter suitably referred to as a biaxially drawn film).

[(d) Heat Treatment Process]

With respect to the biaxially drawn film, heat treatment was performed such that the temperature was lowered to 120° C. at a cooling rate of 2° C./min while maintaining the draw ratio of the biaxially drawn film, and then the temperature was held for 30 minutes while maintaining the draw ratio of the biaxially drawn film (hereinafter, the film which has been subjected to the heat treatment is suitably referred to as a heat-treated film).

Figure 4A:
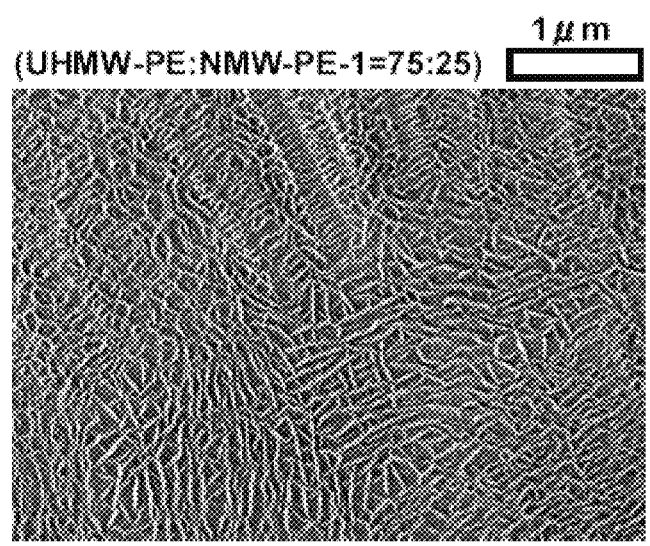
FIG. 4A is a scanning electron micrograph showing a minute structure of a heat-treated film cooled to room temperature after termination of a heat treatment process (d) to be described later in Example 1.

When a surface of the heat-treated film, which has been taken out at room temperature after the heat treatment, was observed by SEM (manufactured by Hitachi High-Technologies Corporation, S-4800, magnification: 25,000 times), it was confirmed that a structure constituted of only lamellar crystals having a uniform thickness (about 30 nm) is uniformly spread over the entire film surface (see, FIG. 4A). It is considered that this is because although disentanglement of molecular chains was progressed by melt-drawing, spontaneous relaxation of molecular orientation occurred in a biaxial melt-drawing process since NMW-PE was contained, a uniform lamellar structure exhibited, and the uniformity of the lamellar crystals was further improved by heat treatment.

The oxygen permeation coefficient and mechanical strength of the obtained heat-treated film to be subjected to the pore formation treatment was measured by the following method.

<Oxygen Permeation Coefficient>

The oxygen permeation coefficient was measured at room temperature (20° C.) by a differential-pressure method using a pressure sensor compliant with JIS K 7126 (ISO 15105-1), using modified K-325N manufactured by Tsukubarikaseiki Corporation.

As a result, the oxygen permeation coefficient of the heat-treated film before pore formation in Example 1 was $1.61 \times 10^{-15}$ mol·m/(m$^2$·s·Pa).

<Mechanical Strength>

The tensile breaking strength was measured at room temperature, using RTC-1325A manufactured by Baldwin Corporation. In the measurement of the tensile breaking strength, sample pieces were cut out from the film into strips (linear portion used for a test: 30.0 mm, width: 5 mm) and provided for the test, and a value obtained by dividing maximum stress of a stress chart, recorded at a tensile speed of 20 mm/min, by a film cross-sectional area was the tensile breaking strength.

As a result, the tensile breaking strength of the heat-treated film before pore formation in Example 1 was 44 MPa.

[(e) Pore Formation Process]

The biaxially drawn film subjected to the heat treatment was simultaneously biaxially drawn to 2.0×2.0 at a drawing temperature (Td) of 120° C. and a drawing speed of 20 mm/min, whereby pores are formed in the biaxially drawn film (the film after termination of the pore formation process is hereinafter referred to as a porous film). Accordingly, the total draw ratio of the obtained porous film was 20.0×20.0.

In the pore formation treatment, it is considered that separation occurred in an amorphous region existing between the minute lamellar crystals formed as above, so that nm level pores were formed.

[(f) Post-Treatment Process]

Although the production process of the present invention includes the processes (a) to (e) as essential processes, in order to further stabilize the pore structure formed in the pore formation treatment, the present embodiment carries out the (f) post-treatment process (second heat treatment process).

In the post-treatment process, in order to further stabilize the micropore structure formed in the pore formation treatment, the film was held for 30 minutes under the post-treatment temperature conditions of 120° C. while the pore formation ratio is held, whereby a polyethylene porous film having a thickness of 30 µm was obtained.

With respect to the obtained polyethylene porous film, the average pore diameter, the specific surface area, the porosity, the oxygen permeation coefficient, and the tensile strength were measured.

<Measurement of Average Pore Diameter, Specific Surface Area, and Porosity>

The average pore diameter, the specific surface area, and the porosity were measured by the mercury intrusion method. More specifically, they were measured at room temperature, using Pascal 140 or 440 (manufactured by CE Instruments Ltd).

As a result, the average pore diameter of the polyethylene porous film of Example 1 was 64.0 nm, the specific surface area was 129.4 m$^2$/g, and the porosity was 34.3%.

<Oxygen Permeation Coefficient>

The oxygen permeation coefficient of the obtained polyethylene porous film was measured in a similar manner as of the film before the pore formation treatment.

As a result, the oxygen permeation coefficient was $7.48 \times 10^{-13}$ mol·m/(m$^2$·s·Pa), and it was found that the polyethylene porous film of Example 1 exhibited a sufficient pore communication property from a practical viewpoint.

<Mechanical Strength>

The tensile breaking strength of the obtained polyethylene porous film was measured in a similar manner as of the film before the pore formation processing.

As a result, the tensile breaking strength of the polyethylene porous film of Example 1 was 67.8 MPa, and it was found that the polyethylene porous film had excellent mechanical properties.

After the polyethylene porous film of Example 1 was dissolved in trichlorobenzene, GPC measurement was carried out under the already described conditions. It was found that 3.6% by mass of a component having a molecular weight of 10,000 (10$^4$ g/mol) or less and 33.2% by mass of a component having a molecular weight of 1 million (10$^6$ g/mol) or more were contained.

Example 2

In Example 2, a polyethylene porous film was obtained similarly to Example 1, except that the mixing ratio of UHMW-PE and NWM-PE-1 was changed to 50:50.

When the oxygen permeation coefficient and the mechanical strength of a heat-treated film before the pore formation treatment were measured similarly to Example 1, the oxygen permeation coefficient was $2.33 \times 10^{-15}$ mol·m/(m$^2$·s·Pa), and the tensile breaking strength was 20.5 MPa.

The obtained polyethylene porous film of Example 2 was evaluated similarly to Example 1. As a result, the average pore diameter was 90.9 nm, the specific surface area was 100.3 m²/g, and the porosity was 34.2%.

Meanwhile, the oxygen permeation coefficient was $9.04 \times 10^{-11}$ mol·m/(m²·s·Pa), and it was found that the polyethylene porous film of Example 2 exhibits an excellent pore communication property.

Further, the tensile breaking strength of the polyethylene porous film of Example 2 was 29.7 MPa, and it was found that the polyethylene porous film of Example 2 has excellent mechanical properties.

After the polyethylene porous film of Example 2 was dissolved in trichlorobenzene, GPC measurement was carried out under the already described conditions. It was found that 7.0% by mass of a component having a molecular weight of 10,000 ($10^4$ g/mol) or less and 21.7% by mass of a component having a molecular weight of 1 million ($10^6$ g/mol) or more were contained.

Example 3

In Example 3, a polyethylene porous film was obtained similarly to Example 1, except that the mixing ratio of UHMW-PE and NMW-PE-1 as raw materials was changed to 60:40.

The obtained polyethylene porous film of Example 3 was evaluated similarly to Example 1. As a result, in the polyethylene porous film of Example 3, the average pore diameter was 89.0 nm, the specific surface area was 239.9 m²/g, and the porosity was 53.8%.

The oxygen permeation coefficient was $8.27 \times 10^{-12}$ mol·m/(m²·s·Pa), and it was found that the polyethylene porous film of Example 3 exhibits an excellent pore communication property.

Further, the tensile breaking strength of the polyethylene porous film of Example 3 was 29.8 MPa, and it was found that the polyethylene porous film of Example 3 has excellent mechanical properties.

Example 3-2

A polyethylene porous film was obtained similarly to Example 3, except that the draw ratio (pore formation ratio) in the pore formation process (e) was changed to 1.5×1.5. In this case, the total draw ratio is 15.0×15.0.

The obtained polyethylene porous film of Example 3-2 was evaluated similarly to Example 1. As a result, in the polyethylene porous film of Example 3-2, the average pore diameter was 142.4 nm, the specific surface area was 90.5 m²/g, and the porosity was 48.0%.

The oxygen permeation coefficient was $7.40 \times 10^{-12}$ mol·m/(m²·s·Pa), and the tensile breaking strength was 25.2 MPa.

Example 4

In Example 4, a polyethylene porous film was obtained similarly to Example 2, except that NMW-PE-2 was used instead of NMW-PE-1 (the mixing ratio of UHMW-PE and NMW-PE-2 was 50:50).

The obtained polyethylene porous film of Example 4 was evaluated similarly to Example 1. As a result, in the polyethylene porous film of Example 4, the average pore diameter was 53.1 nm, the specific surface area was 731.0 m²/g, and the porosity was 44.5%.

Meanwhile, the oxygen permeation coefficient was $3.95 \times 10^{-10}$ mol·m/(m²·s·Pa), and it was found that the polyethylene porous film of Example 4 exhibits a very excellent pore communication property.

The tensile breaking strength of the polyethylene porous film of Example 4 was 25.1 MPa, and it was found that the polyethylene porous film has excellent mechanical properties.

Figure 7:
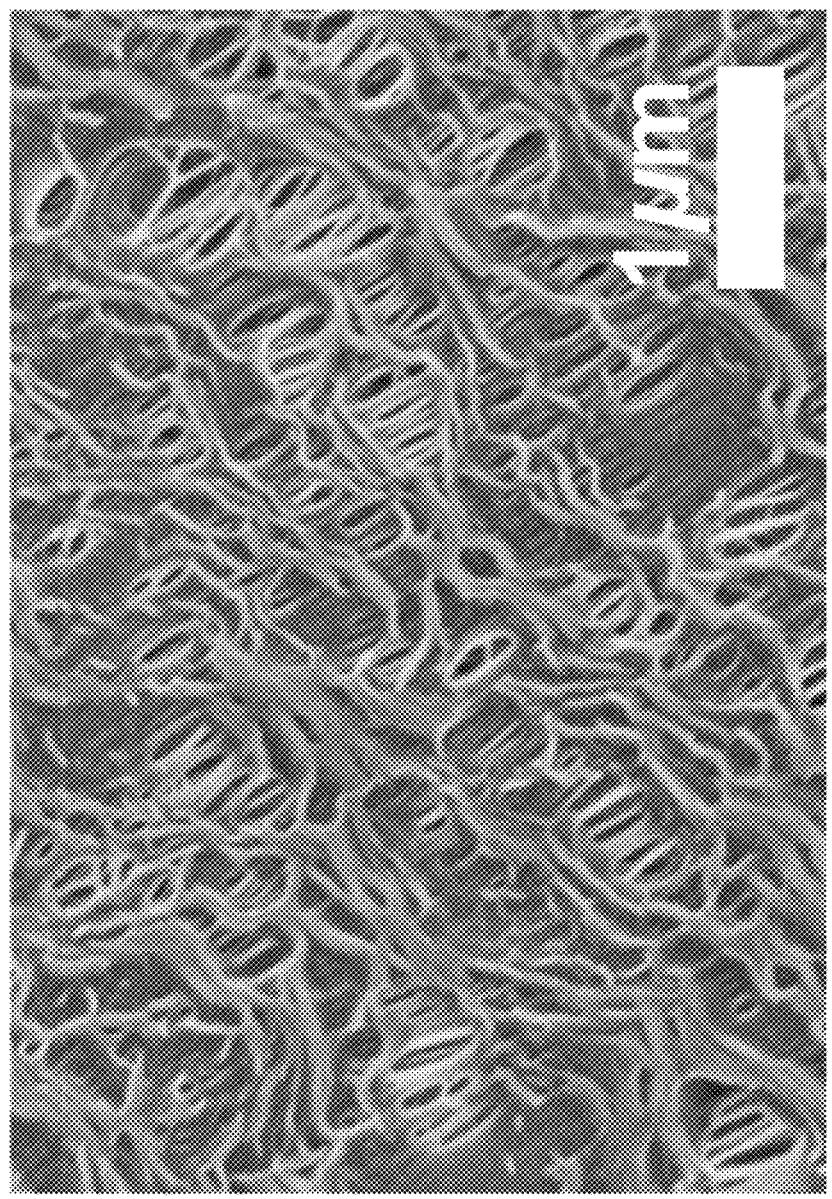
FIG. 7 is a scanning electron micrograph showing a surface of a polyethylene porous film obtained in Example 4.

After the polyethylene porous film of Example 4 was dissolved in trichlorobenzene, GPC measurement was carried out under the already described conditions. It was found that 5.6% by mass of a component having a molecular weight of 10,000 ($10^4$ g/mol) or less and 22.2% by mass of a component having a molecular weight of 1 million ($10^6$ g/mol) or more were contained. FIG. 7 shows a scanning electron micrograph of the polyethylene porous film obtained in Example 4.

Example 5

A polyethylene porous film was obtained similarly to Example 1, except that the draw ratio (pore formation ratio) in the pore formation process (e) was changed to 1.5×1.5. In this case, the total draw ratio was 15.0×15.0.

The obtained polyethylene porous film of Example 5 was evaluated similarly to Example 1. As a result, in the polyethylene porous film of Example 5, the average pore diameter was 90.9 nm, the specific surface area was 149.3 m²/g, and the porosity was 48.9%.

The oxygen permeation coefficient was $9.28 \times 10^{-13}$ mol·m/(m²·s·Pa), and it was found that the polyethylene porous film of Example 5 exhibits a sufficient pore communication property from a practical viewpoint.

The tensile breaking strength of the polyethylene porous film of Example 5 was 29.5 MPa, and it was found that the polyethylene porous film has extremely excellent mechanical properties.

Figure 8:
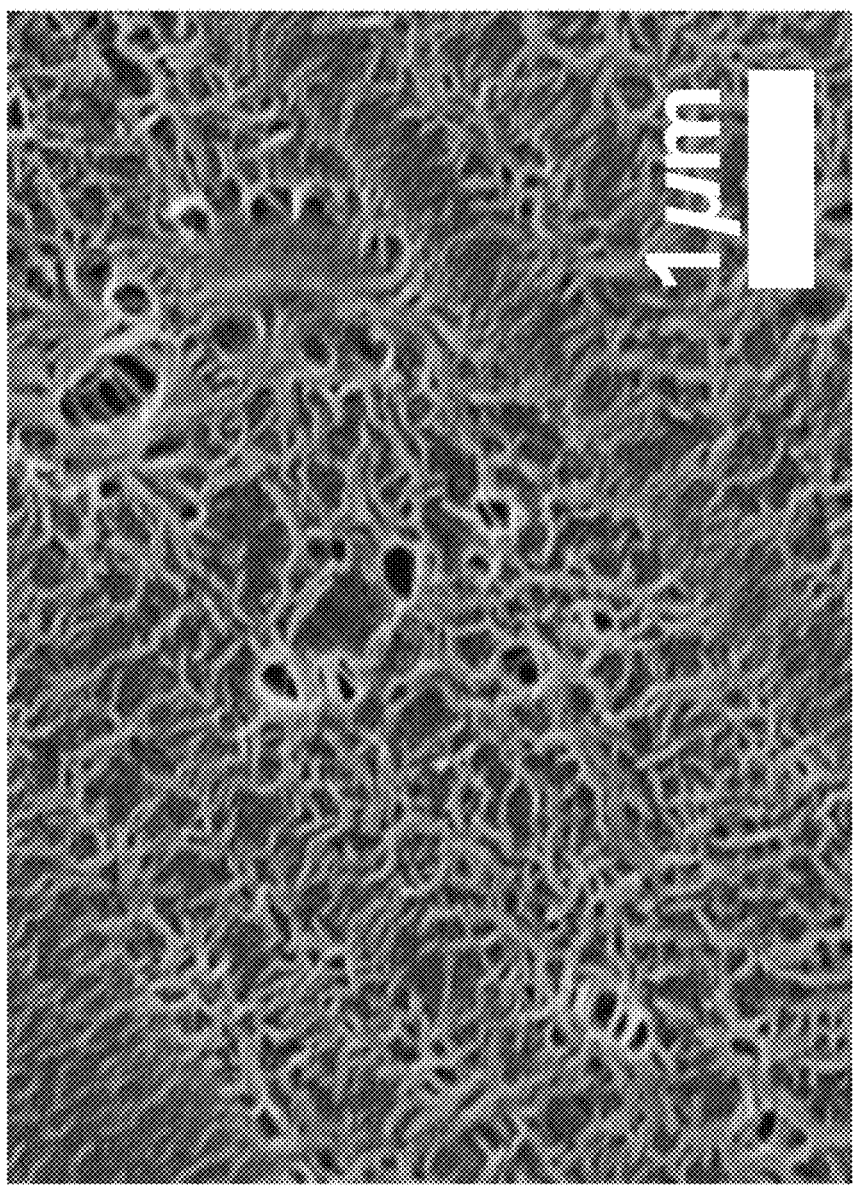
FIG. 8 is a scanning electron micrograph showing a surface of a polyethylene porous film obtained in Example 5.

FIG. 8 shows a scanning electron micrograph of the polyethylene porous film obtained in Example 5.

Example 6

A polyethylene porous film was obtained similarly to Example 2, except that the draw ratio (pore formation ratio) in the pore formation process (e) was changed to 1.5×1.5. In this case, the total draw ratio was 15.0×15.0.

The obtained polyethylene porous film of Example 6 was evaluated similarly to Example 1. As a result, in the polyethylene porous film of Example 6, the average pore diameter was 66.7 nm, the specific surface area was 54.7 m²/g, and the porosity was 33.3%.

The oxygen permeation coefficient was $9.31 \times 10^1$ mol·m/(m²·s·Pa), and it was found that the polyethylene porous film of Example 6 exhibits an excellent oxygen permeation coefficient.

The tensile breaking strength of the polyethylene porous film of Example 6 was 21.5 MPa, and it was found that the polyethylene porous film has excellent mechanical properties.

Example 6-2

A polyethylene porous film was obtained similarly to Example 6, except that the draw ratio (pore formation ratio) in the pore formation process (e) was changed to 2.5×2.5. In this case, the total draw ratio was 25.0×25.0.

The obtained polyethylene porous film of Example 6-2 was evaluated similarly to Example 1. As a result, in the polyethylene porous redrawn film of Example 6-2, the average pore diameter was 53.5 nm, the specific surface area was 241.64 m²/g, and the porosity was 42.0%.

The oxygen permeation coefficient was $1.11 \times 10^{-10}$ mol·m/(m²·s·Pa), and the tensile breaking strength was 37.3 MPa.

Example 7

A polyethylene porous film was obtained similarly to Example 2, except that the drawing temperature (Td) in the pore formation process (e) was changed to 110° C.

The obtained polyethylene porous film of Example 7 was evaluated similarly to Example 1. As a result, in the polyethylene porous film of Example 7, the oxygen permeation coefficient was $1.53 \times 10^{-10}$ mol·m/(m²·s·Pa), and it was found that the polyethylene porous film of Example 7 exhibits a very excellent pore communication property.

Figure 9:
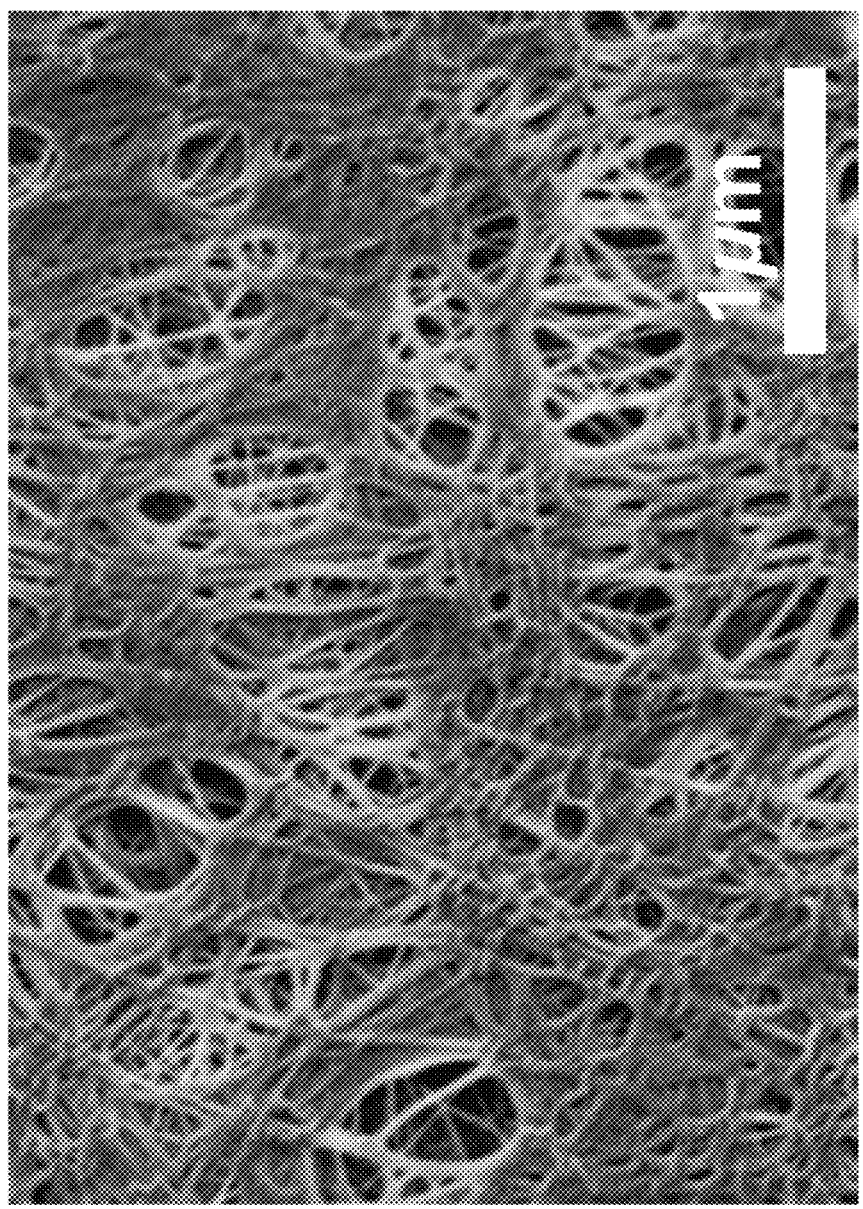
FIG. 9 is a scanning electron micrograph showing a surface of a polyethylene porous film obtained in Example 7.

FIG. 9 shows a scanning electron micrograph of the polyethylene porous film obtained in Example 7.

Example 7-2

A polyethylene porous film was obtained similarly to Example 2, except that the drawing temperature (Td) in the pore formation process (e) was changed to 130° C.

The obtained polyethylene porous film of Example 7-2 was evaluated similarly to Example 1. As a result, in the polyethylene porous film of Example 7-2, the oxygen permeation coefficient was $6.93 \times 10^{-12}$ mol·m/(m²·s·Pa), and it was found that the polyethylene porous film of Example 7-2 exhibits an excellent pore communication property.

Example 8

A polyethylene porous film was obtained similarly to Example 2, except that the drawing temperature (Td) in the pore formation process (e) was changed to 140° C.

The obtained polyethylene porous film of Example 8 was evaluated similarly to Example 1. As a result, in the polyethylene porous film of Example 8, the oxygen permeation coefficient was $2.25 \times 10^{-12}$ mol·m/(m²·s·Pa), and it was found that the polyethylene porous film of Example 8 exhibits a sufficient pore communication property from a practical viewpoint.

Figure 10:
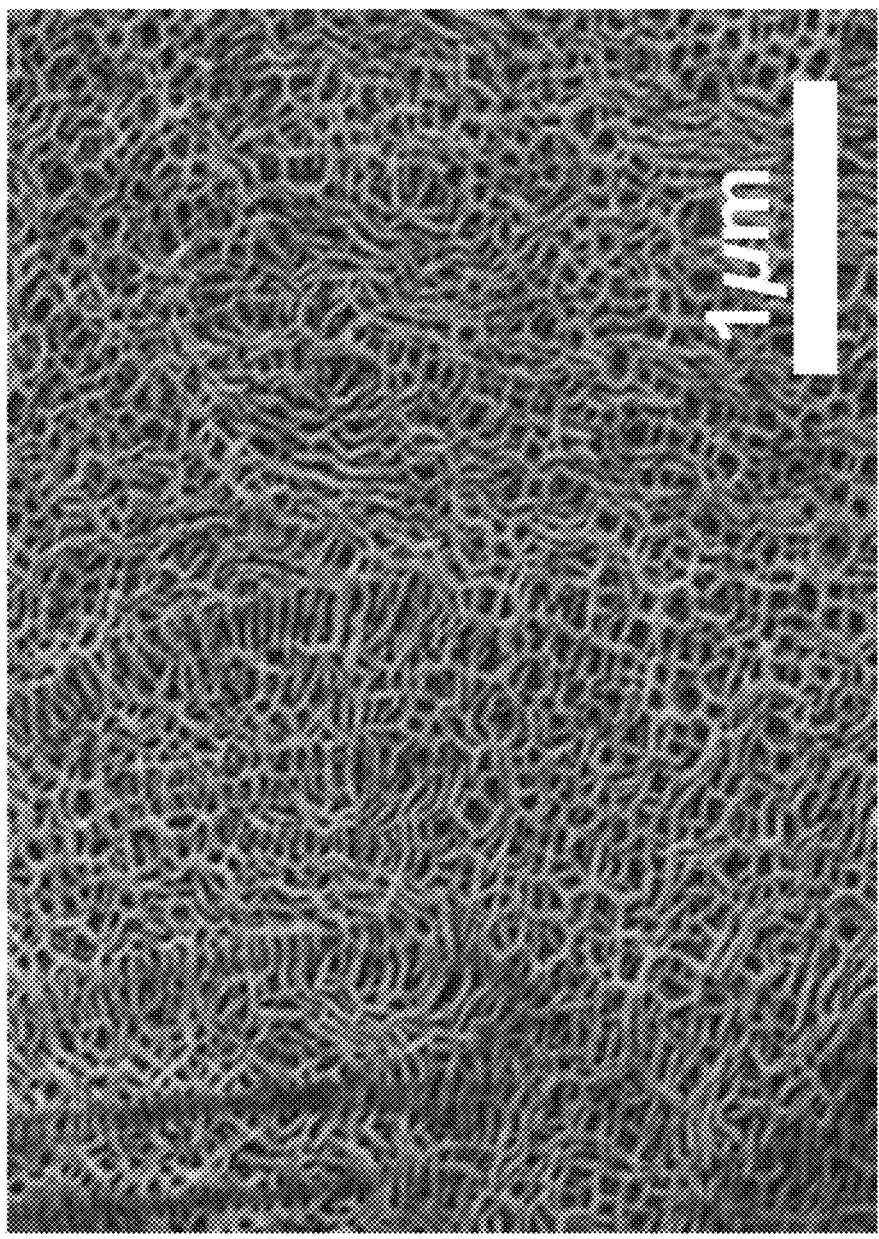
FIG. 10 is a scanning electron micrograph showing a surface of a polyethylene porous film obtained in Example 8.

FIG. 10 shows a scanning electron micrograph of the polyethylene porous film obtained in Example 8.

From the evaluation results of the polyethylene porous films of Example 2 and Examples 7 to 8, it is preferable that the drawing temperature in the pore formation process (e) is 140° C. or less, and particularly when the drawing temperature is 120° C. or less, it is found that a higher pore communication property is exhibited.

Example 9

A polyethylene porous film was obtained similarly to Example 2, except that the drawing speed in the pore formation process (e) was changed to 5 mm/min.

The obtained polyethylene porous film of Example 9 was evaluated similarly to Example 1. As a result, the oxygen permeation coefficient was $9.01 \times 10^{-11}$ mol·m/(m²·s·Pa), and it was found that the polyethylene porous film of Example 9 exhibits an excellent pore communication property.

Example 10

A polyethylene porous film was obtained similarly to Example 2, except that the drawing speed in the pore formation process (e) was changed to 100 mm/min.

The obtained polyethylene porous film of Example 10 was evaluated similarly to Example 1. As a result, the oxygen permeation coefficient was $1.06 \times 10^{1}$ mol·m/(m²·s·Pa), and it was found that the polyethylene porous film of Example 10 exhibits an excellent pore communication property.

A comparison of the evaluation results of Example 2, Example 9, and Example 10 shows that an excellent pore communication property is exhibited when the drawing speed in the pore formation process (e) is in the range of from at least 5 mm/min to 100 mm/min.

Examples 11

In Example 2, in the film formation process (b), both roll molding and press molding were carried out under the following conditions.

<Roll Molding>

1.0 g of the mat-like mixture was sandwiched between polyimide release films (Upilex 125S produced by Ube Industries, Ltd.) (thickness: 125 μm) and subjected to roll molding at 145° C. and at a roll rotation speed of 3 m/min compliant with the description of JP-A No. 2003-165155, and this operation was carried out several times to obtain several numbers of films having a thickness of 75 μm.

<Press Molding>

The films (thickness: 75 μm) obtained by the roll molding were stacked, and the laminate was subjected to press molding. As shown in FIG. 3, a polyimide release film (2) (Upilex 125S produced by Ube Industries, Ltd.) having a thickness of 125 μm was put on a disk-shaped stainless plate (1) having a diameter of 110 mmφ×a thickness of 2 mm, a disk-shaped stainless plate (3) having a diameter of 110 mmφ×a thickness of 0.25 mm from which a rectangular window having a size of 70 mm×70 mm has been bored was then put thereon, and four films which were obtained by the roll molding, each has a thickness of about 75 μm, and were cut into a size of 70 mm×70 mm were stacked in the rectangular window so that roll directions are alternated (perpendicular state). A polyimide release film (4) having a thickness of 125 μm was put thereon, and a disk-shaped stainless plate (5) having a diameter of 110 mmφ×a thickness of 2 mm was further put thereon.

The assembly was held between upper and lower press mechanisms installed in a bench press apparatus, and was maintained at 190° C., which corresponds to the melting point or more of polyethylene, for five minutes. Then, melt press molding was carried out at a pressure of 2.5 MPa (cylinder pressure: 30 MPa). After the temperature was slowly lowered to room temperature, the laminate was taken out, whereby a film (hereinafter suitably referred to as a roll-press-molded film) containing UHMW-PE and NWM-PE-1 at a mass ratio of 50:50 was formed.

This roll-press-molded film was taken out at room temperature and subjected to the drawing process (c), the heat treatment process (d), the pore formation process (e), and the post-treatment process (f) under the conditions similar to those of Example 2, whereby a polyethylene porous film was obtained.

The obtained polyethylene porous film of Example 11 was evaluated similarly to Example 1. As a result, the oxygen permeation coefficient was $8.14 \times 10^{-11}$ mol·m/(m²·s·Pa), and it was found that the polyethylene porous film of Example 11 exhibits an excellent pore communication property. Further, the tensile breaking strength was 32.7 MPa, and it was found that the polyethylene porous film has excellent mechanical properties.

Comparative Example 1

In Example 1, when a polyethylene porous film was to be formed similarly to Example 1, using only the UHMW-PE raw material without mixing the NMW-PE raw material, a large number of fully extended chains were generated in the drawing process (c) after the film formation. Although the film was heat-treated (d), the fully extended chains were not sufficiently reduced or did not sufficiently disappear, and film breakage occurred in the course of biaxial drawing in the pore formation treatment process (e), so that a porous film could not be formed.

After the heat-treated film of Comparative Example 1 obtained in the heat treatment process (d) and having a draw ratio of 10×10 was dissolved in trichlorobenzene, GPC measurement was carried out under the already described conditions. It was found that while the heat-treated film contains only less than 1% by mass of a component having a molecular weight of 10,000 ($10^4$ g/mol) or less, the film contains 45% by mass of a component having a molecular weight of 1 million ($10^6$ g/mol) or more.

Comparative Example 2

A polyethylene porous film of Comparative Example 2 was obtained similarly to Example 1, except that the mixing ratio of UHMW-PE and NMW-PE-1 was changed to 25:75.

The obtained polyethylene porous film of Comparative Example 2 was evaluated similarly to Example 1. As a result, in the polyethylene porous film of Comparative Example 2, the average pore diameter was 69.2 nm, the specific surface area was 229.6 m$^2$/g, and the porosity was 37.1%.

The oxygen permeation coefficient was $1.0 \times 10^{-9}$ mol·m/(m$^2$·s·Pa), and it was found that the polyethylene porous film of Comparative Example 2 exhibits a very excellent pore communication property.

On the other hand, the tensile breaking strength of the polyethylene porous film of Comparative Example 2 was 0.50 MPa, and accordingly a porous film having sufficient strength from a practical viewpoint could not be obtained.

After the polyethylene porous film of Comparative Example 2 was dissolved in trichlorobenzene, GPC measurement was carried out under the already described conditions. It was found that the polyethylene porous film contains 10.5% by mass of a component having a molecular weight of 10,000 ($10^4$ g/mol) or less and 11.4% by mass of a component having a molecular weight of 1 million ($10^6$ g/mol) or more.

Comparative Example 3

In Example 1, the film (thickness: 0.3 mm) obtained in the film formation process (b) was evaluated similarly to Example 1. As a result, the oxygen permeation coefficient was $2.67 \times 10^{-15}$ mol·m/(m$^2$·s·Pa), and it was found that a nonporous film was obtained.

Comparative Example 4

In Example 2, the film subjected to the drawing process (c) was subjected to the pore formation process (e) and then subjected to the post-treatment process (f) without going through the heat treatment process (d), whereby a polyethylene porous film of Comparative Example 4 was obtained.

Figure 11:
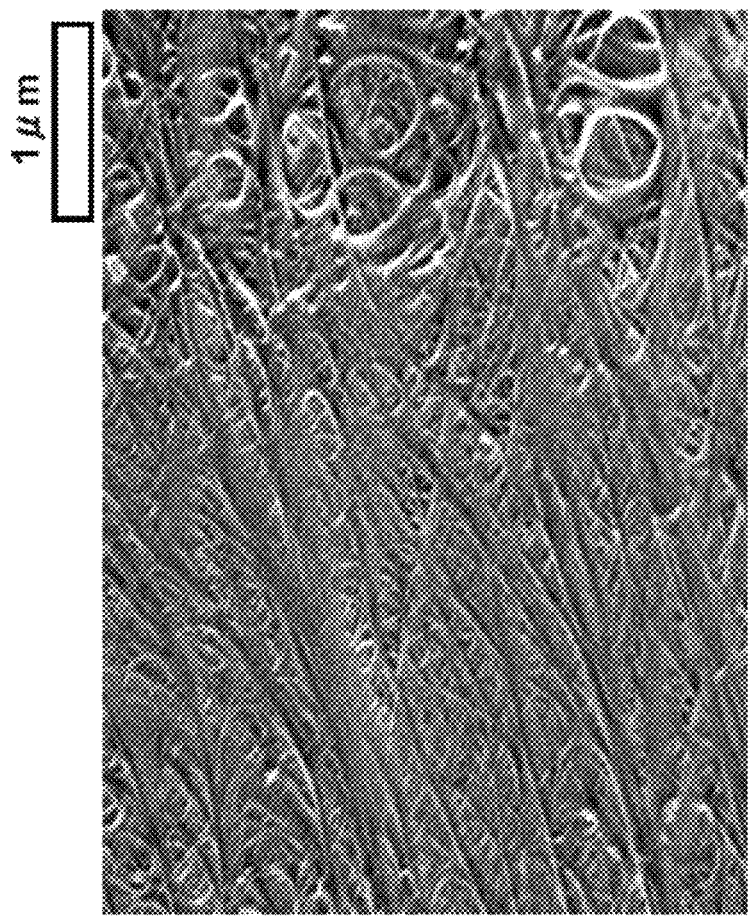
FIG. 11 is a scanning electron micrograph showing a surface of a polyethylene film obtained in Comparative Example 4.

FIG. 11 shows a scanning electron micrograph of the polyethylene porous film obtained in Comparative Example 4. In comparing FIG. 11 and FIG. 5B showing a taken image of the porous film obtained in Example 2, it is found that in a case in which the pore formation process (e) is carried out without carrying out the heat treatment process (d), communicated pores are hardly formed. For this reason, in this invention, the heat treatment process (d) is essential.

Reference Example 1

The pore characteristics of a commercially available ultrahigh molecular weight polyethylene porous film (HiPore produced by Asahi Kasei E-materials Corporation and used for a lithiumion battery separator) having a thickness of 25 μm were evaluated similarly to Example 1 by the mercury intrusion method. The average pore diameter was 50.5 m, the specific surface area was 164.5 m$^2$/g, and the porosity was 45.0%.

When the oxygen permeation coefficient was measured similarly to Example 1, it was $8.02 \times 10^{-11}$ mol·m/(m$^2$·s·Pa).

Accordingly, the pore size, the porosity, and the oxygen permeation coefficient of the porous film of the present invention was on the same level as those commercially available products.

In some processes in the production processes of Examples 1 to 3 and Comparative Examples 1, 2, and 4, a minute structure of a film was observed with a scanning electron microscope and verified.

FIG. 4A is a scanning electron micrograph showing a minute structure of a film (heat-treated film) cooled to room temperature after termination of the heat treatment process (d) in Example 1.

Figure 4B:
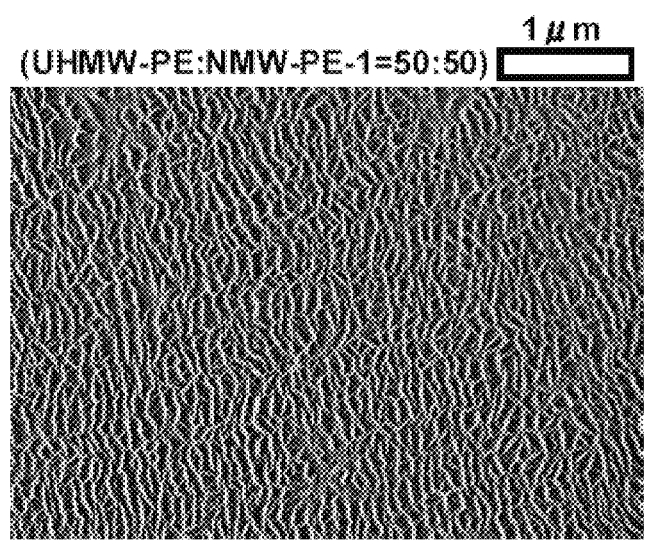
FIG. 4B is a scanning electron micrograph showing a minute structure of a heat-treated film cooled to room temperature after termination of the heat treatment process (d) to be described later in Example 2.

FIG. 4B is a scanning electron micrograph showing a minute structure of a film (heat-treated film) cooled to room temperature after the heat treatment process (d) in Example 2.

Figure 4C:
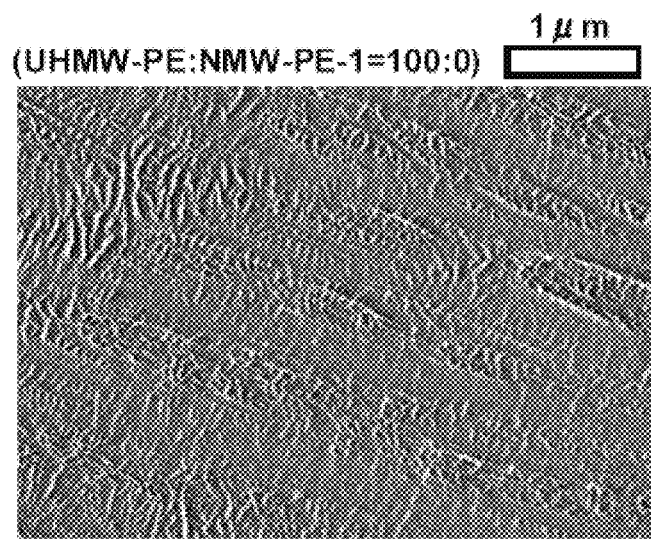
FIG. 4C is a scanning electron micrograph showing a minute structure of a heat-treated film cooled to room temperature after termination of the heat treatment process (d) to be described later in Comparative Example 1.

FIG. 4C is a scanning electron micrograph showing a minute structure of a film (heat-treated film) cooled to room temperature after the heat treatment process (d) in Comparative Example 1.

Figure 4D:
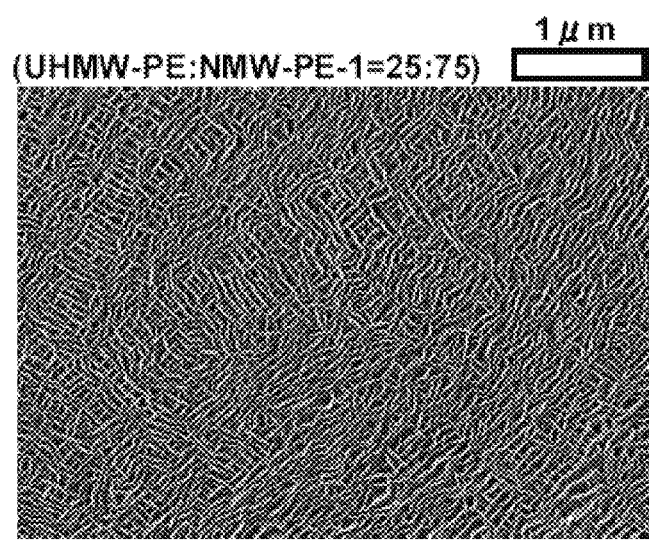
FIG. 4D is a scanning electron micrograph showing a minute structure of a heat-treated film cooled to room temperature after termination of the heat treatment process (d) to be described later in Comparative Example 2.

FIG. 4D is a scanning electron micrograph showing a minute structure of a film (heat-treated film) cooled to room temperature after the heat treatment process (d) in Comparative Example 2.

Those micrographs of Example 1 (FIG. 4A), Example 2 (FIG. 4B), and Comparative Example 2 (FIG. 4D) each show a uniform and minute uneven pattern from which existence of lamellar crystals is assumed. Meanwhile, in the micrograph of Comparative Example 1 (FIG. 4C), a macro stripe pattern showing formation of fully extended chain crystal is clearly confirmed on a surface of the heat-treated film.

As described above, in Comparative Example 1 (FIG. 4C), although the pore formation process (e) was applied to the film after the heat treatment process (d), the film was broken, and a porous film could not be obtained.

Figure 5A:
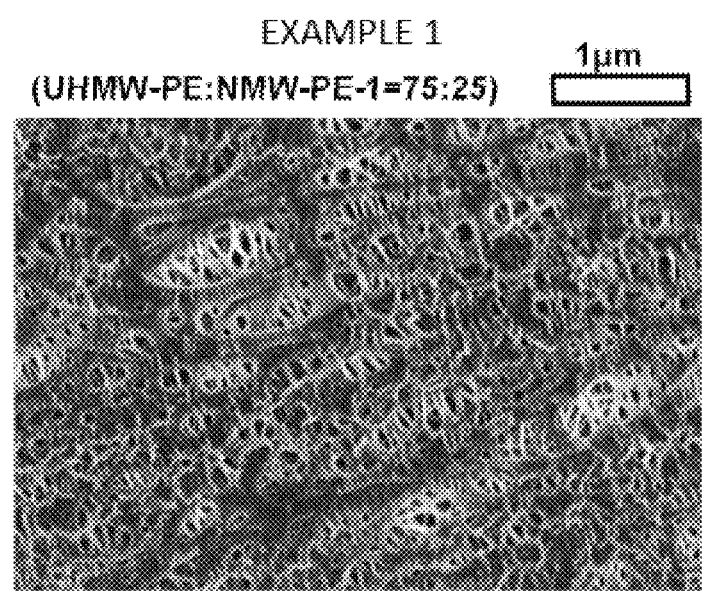
FIG. 5A is a scanning electron micrograph showing a minute structure of a polyethylene porous film obtained in Example 1.
Figure 5B:
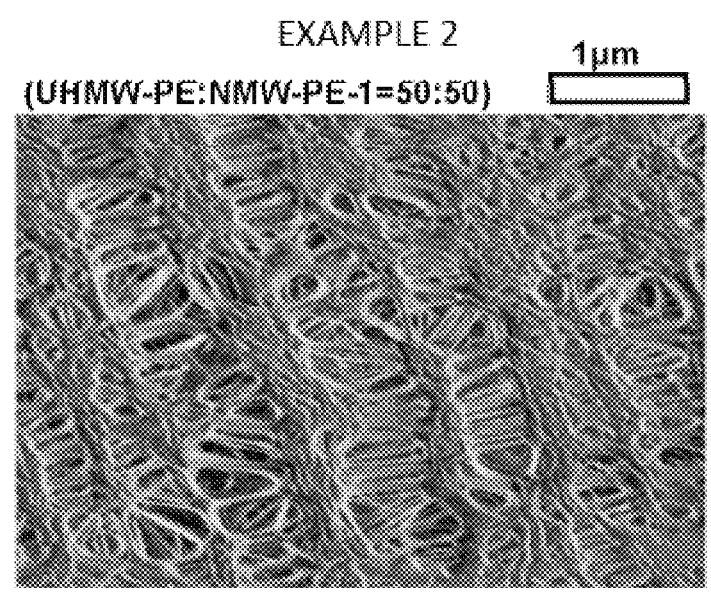
FIG. 5B is a scanning electron micrograph showing a minute structure of a polyethylene porous film obtained in Example 2.

FIG. 5A is a scanning electron micrograph showing a surface of a polyethylene porous film obtained by applying the pore formation process (e) and the post-treatment process (f) to the heat-treated film shown in FIG. 4A in Example 1.

FIG. 5B is a scanning electron micrograph showing a surface of a polyethylene porous film obtained by applying the pore formation process (e) and the post-treatment process (f) to the heat-treated film shown in FIG. 4B in Example 2.

Figure 5C:
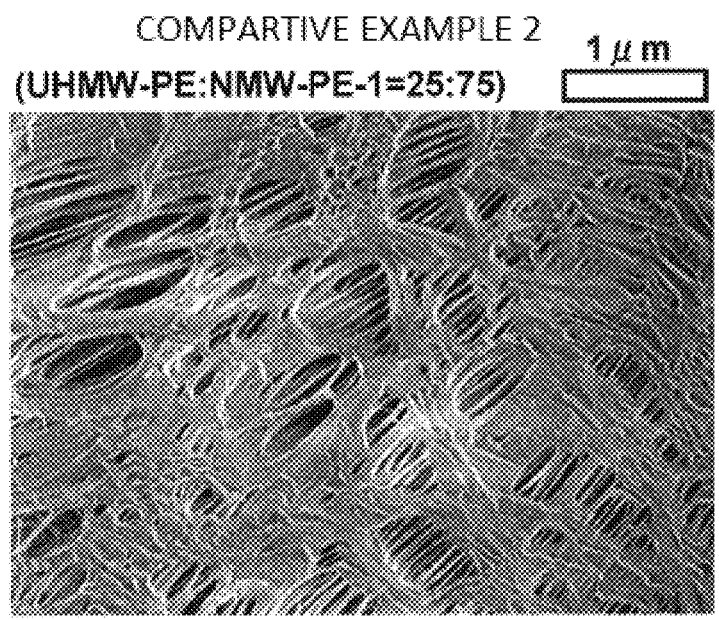
FIG. 5C is a scanning electron micrograph showing a minute structure of a polyethylene porous film obtained in Comparative Example 2.

FIG. 5C is a scanning electron micrograph showing a surface of a polyethylene porous film obtained by applying the pore formation process (e) and the post-treatment process (f) to the heat-treated film shown in FIG. 4C in Comparative Example 2.

In Example 1 (FIG. 5A) and Example 2 (FIG. 5B), formation of minute and uniform pores was confirmed. Meanwhile, in Comparative Example 2 (FIG. 5C), although there are many pores, there are also nonporous portions, and thus a nonuniform pore structure is formed. Thus, it is considered that although the pore volume, the specific surface area, and the oxygen permeation coefficient are high, the tensile strength is significantly lowered. Meanwhile, in Examples 1 and 2, since small and uniform pore structures were obtained, it is considered that the films each exhibited a high breaking strength with sufficient pore volume, specific surface area, and oxygen permeation coefficient.

Figure 6:
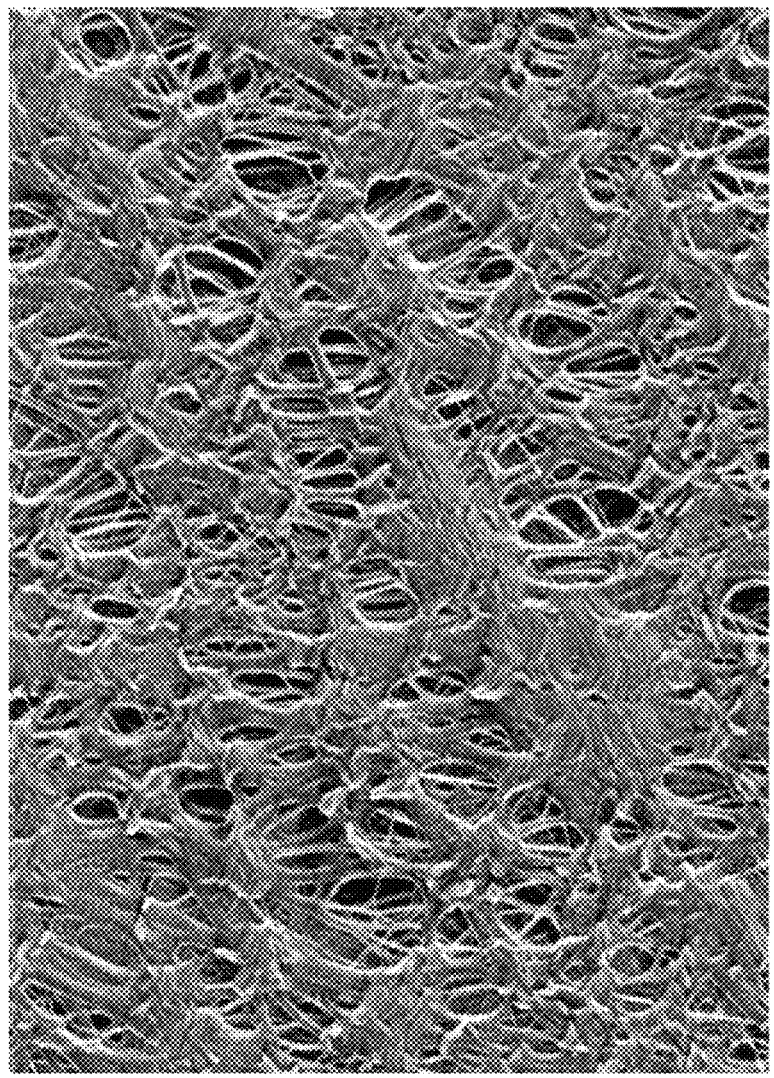
FIG. 6 is a scanning electron micrograph showing a surface of a polyethylene porous film obtained in Example 3.

FIG. 6 is a scanning electron micrograph showing a surface of a polyethylene porous film finally obtained in Example 3. As compared with Comparative Example 2 (FIG. 5C), it is found that the porous film of Example 3 has smaller pores. Thus, it is assumed that the porous film of Example 3 is different from Comparative Example 2 and exhibits a high breaking strength.

FIG. 7 is a scanning electron micrograph showing a surface of a polyethylene porous film finally obtained in Example 4. It is found that the porous film has uniform and small pores. Thus, it is assumed that the porous film of Example 4 exhibits an excellent gas permeability and high breaking strength.

FIG. 8 is a scanning electron micrograph showing a surface of a polyethylene porous film finally obtained in Example 5. Although the pore formation ratio is different from that in Example 1, the porous film of Example 5 has uniform and small pores as in Example 1, and the porous film of Example 5 exhibits more excellent gas permeability than the porous film of Example 1. Meanwhile, in the breaking strength, since the pore formation ratio (draw ratio) is lower than that of the porous film of Example 1, a value of the breaking strength is slightly lower; however, the breaking strength has no problem in practical use.

FIG. 9 is a scanning electron micrograph showing a surface of a polyethylene porous film finally obtained in Example 7. Although the porous film was produced under such a condition that the pore formation treatment temperature was lower than that in Example 2, it is found that the porous film of Example 7 has small pores similar to those of Example 2. Thus, it is assumed that the porous film obtained in Example 7 also exhibits an excellent oxygen permeability.

FIG. 10 is a scanning electron micrograph showing a surface of a polyethylene porous film finally obtained in Example 9. The porous film was produced under such a condition that the pore formation treatment temperature was higher than that in Example 2, and it is found that the porous film obtained in Example 9 has smaller pores than the porous film of Example 2. Thus, although the oxygen permeability of the porous film obtained in Example 8 is slightly lower than that of the porous film of Example 2, its level has no problem in practical use.

INDUSTRIAL APPLICABILITY

In a polyethylene porous film of the present invention and a polyethylene porous film obtained by a process for producing the polyethylene porous film of this invention, since the polyethylene porous film has so small micropore diameter as nm order (for example, 200 nm or less) and has large pore volume and specific surface area, the porous film has excellent ion permeability and power generation performance.

Currently, it is industrially desirable that at a stage of manufacturing a cell stack of a lithium ion battery, a separator film and an electrode are wound around a core at higher tension for integration to realize high output. However, in the existing lithium ion battery, when the assembly is formed into a flat shape after winding, the film is folded and is thus apt to be broken. Meanwhile, since the polyethylene porous film of this invention and the polyethylene porous film obtained by the process for producing the polyethylene porous film of this invention have high tensile breaking strength and tear strength, high integration of a cell stack can be realized, so that the output of a lithium ion battery can be increased.

The polyethylene porous film of this invention is suitably utilized in various fields such as a water purification film, an air filter, a filtration film such as an artificial dialysis membrane, a glucose sensor diaphragm, and a cell proliferation substrate.

The entire disclosure of Japanese Patent Application No. 2012-189287 is incorporated by reference in this specification.

All contents of the documents, patent applications, and technical standards described in this specification are incorporated herein by reference to the same extent as that when it is specifically and individually described that the respective documents, patent applications, and the technical standards are incorporated herein by reference.

The invention claimed is:

1. A process for producing a polyethylene porous film comprising:
    a mixture preparation step of preparing a mixture that contains an ultrahigh molecular weight polyethylene having a viscosity average molecular weight of from 1 million to 15 million and a polyethylene having a weight average molecular weight of from 10,000 to 800,000 at a mass ratio of from 50:50 to 99:1;
    a film formation step of heating and melting the mixture and forming the mixture into a film;
    a drawing step of biaxially drawing the film in x-axis and y-axis directions at a temperature greater than or equal to a melting point of the film and less than or equal to 180° C.;
    a heat treatment step of heat-treating the biaxially drawn film at a temperature greater than or equal to room temperature and less than or equal to 180° C., while maintaining a draw ratio of the biaxially drawn film without shrinking the film; and
    a pore formation step of only redrawing the heat-treated film at a temperature of 140° C. or less along at least one of the x axis or the y axis.

2. The process for producing a polyethylene porous film according to claim 1, further comprising, after the pore formation step, a second heat treatment step of heat-treating the film, which has been subjected to the pore formation treatment, at a temperature greater than or equal to room temperature and less than or equal to 180° C., while maintaining a redraw ratio.

3. The process for producing a polyethylene porous film according to claim 2, wherein, in the mixture preparation step, the mixture of the ultrahigh molecular weight polyethylene having a viscosity average molecular weight of from 1 million to 15 million and the polyethylene having a weight average molecular weight of from 10,000 to 800,000 is added to one or more solvents selected from the group consisting of p-xylene, m-xylene, o-xylene, trichlorobenzene, dichlorobenzene, decalin, tetralin and liquid paraffin, the obtained mixture is heated to a temperature greater than or equal to room temperature and less than or equal to the boiling point of the solvent to be used and is dissolved, and thereafter, the solvent is removed from the mixture.

4. The process for producing a polyethylene porous film according to claim 2, wherein, in the film formation step, the mixture obtained in the mixture preparation step is subjected to melt press molding at a temperature of from 140° C. to 250° C. and under a pressurized condition of from 0.1 MPa to 100 MPa.

5. The process for producing a polyethylene porous film according to claim 2, wherein the film formation step further comprises a step of stacking films formed by heating and melting the mixture obtained in the mixture preparation step, and thereby forming a laminate.

6. The process for producing a polyethylene porous film according to claim 1, wherein, in the mixture preparation step, the mixture of the ultrahigh molecular weight polyethylene having a viscosity average molecular weight of from 1 million to 15 million and the polyethylene having a weight average molecular weight of from 10,000 to 800,000 is added to one or more solvents selected from the group consisting of p-xylene, m-xylene, o-xylene, trichlorobenzene, dichlorobenzene, decalin, tetralin and liquid paraffin, the obtained mixture is heated to a temperature greater than or equal to room temperature and less than or equal to the boiling point of the solvent to be used and is dissolved, and thereafter, the solvent is removed from the mixture.

7. The process for producing a polyethylene porous film according to claim 1, wherein, in the film formation step, the mixture obtained in the mixture preparation step is subjected to melt press molding at a temperature of from 140° C. to 250° C. and under a pressurized condition of from 0.1 MPa to 100 MPa.

8. The process for producing a polyethylene porous film according to claim 1, wherein the film formation step further comprises a step of stacking films formed by heating and melting the mixture obtained in the mixture preparation step, and thereby forming a laminate.

* * * * *